US012306531B2

(12) United States Patent
Kim et al.

(10) Patent No.: US 12,306,531 B2
(45) Date of Patent: May 20, 2025

(54) LITHOGRAPHY AND METHOD OF FABRICATING SEMICONDUCTOR DEVICE USING THE SAME

(71) Applicant: SAMSUNG ELECTRONICS CO., LTD., Suwon-si (KR)

(72) Inventors: Wooseok Kim, Yongin-si (KR); Noyoung Chung, Hwaseong-si (KR); Byung Je Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 578 days.

(21) Appl. No.: 17/692,438

(22) Filed: Mar. 11, 2022

(65) Prior Publication Data

US 2023/0055365 A1 Feb. 23, 2023

(30) Foreign Application Priority Data

Aug. 20, 2021 (KR) ........................ 10-2021-0109909

(51) Int. Cl.
*G03F 1/36* (2012.01)
*G06F 30/398* (2020.01)

(52) U.S. Cl.
CPC .............. *G03F 1/36* (2013.01); *G06F 30/398* (2020.01)

(58) Field of Classification Search
CPC ....................................................... G03F 1/36
USPC .......................................................... 716/53
See application file for complete search history.

(56) References Cited

U.S. PATENT DOCUMENTS

| | | |
|---|---|---|
| 7,755,753 B2 | 7/2010 | Takahashi et al. |
| 7,975,245 B2 | 7/2011 | Florence et al. |
| 8,547,545 B2 | 10/2013 | Sasazawa et al. |
| 10,262,408 B2 | 4/2019 | Park et al. |
| 10,474,042 B2 | 11/2019 | Biafore et al. |
| 2008/0285413 A1* | 11/2008 | Milster ............ G11B 20/10046 369/59.23 |
| 2018/0275523 A1* | 9/2018 | Biafore .............. G01N 21/8851 |
| 2018/0300870 A1 | 10/2018 | Park et al. |
| 2020/0033122 A1 | 1/2020 | Toyoda et al. |
| 2020/0326634 A1* | 10/2020 | Preil ....................... G03F 7/705 |

(Continued)

FOREIGN PATENT DOCUMENTS

KR 10-2019-0130175 A 11/2019
KR 10-2021-0052531 A 5/2021

*Primary Examiner* — Jack Chiang
*Assistant Examiner* — Suchin Parihar
(74) *Attorney, Agent, or Firm* — Sughrue Mion, PLLC

(57) ABSTRACT

A method includes grouping, in a first layout, pattern regions which have duplicate layout patterns including weak regions as a group, calculating defect probabilities of the pattern regions, respectively, calculating a defect frequency and a defect rate of the group based on the defect probabilities of the pattern regions, predicting a degree of defects of a second layout of the pattern regions, based on the defect frequency and the defect rate, and performing an extreme ultraviolet (EUV) lithography process on a substrate, based on the second layout. The defect probabilities are calculated by performing an optical proximity correction (OPC) simulation on the pattern region, calculating a stochastic variation of a linewidth of a simulation pattern in the weak region as a Gaussian distribution, and defining a threshold linewidth, which is used as a reference of the random defect, in the Gaussian distribution.

20 Claims, 25 Drawing Sheets

(56) References Cited

U.S. PATENT DOCUMENTS

| | | |
|---|---|---|
| 2021/0056305 A1 | 2/2021 | Zhuang et al. |
| 2021/0396692 A1* | 12/2021 | Fukuda ................. G06T 7/0004 |
| 2022/0327364 A1* | 10/2022 | Hunsche ................. G06N 7/01 |
| 2024/0288764 A1* | 8/2024 | Hamouda ............... G03F 7/705 |
| 2024/0303824 A1* | 9/2024 | Lee ........................... G06T 7/12 |

* cited by examiner

ND METHOD OF
LITHOGRAPHY AND METHOD OF FABRICATING SEMICONDUCTOR DEVICE USING THE SAME

CROSS-REFERENCE TO RELATED APPLICATIONS

This U.S. non-provisional patent application claims priority under 35 U. S. C. § 119 to Korean Patent Application No. 10-2021-0109909, filed on Aug. 20, 2021, in the Korean Intellectual Property Office, the entire contents of which are hereby incorporated by reference.

BACKGROUND OF THE INVENTION

The present disclosure relates to a method of fabricating a semiconductor device using a method of predicting defects in an EUV lithography process.

Due to their small-sized, multifunctional, and/or low-cost characteristics, semiconductor devices are being esteemed as important elements in the electronics industry. The semiconductor devices are classified into a semiconductor memory device for storing data, a semiconductor logic device for processing data, and a hybrid semiconductor device including both of memory and logic elements. As the electronic industry advances, there is an increasing demand for semiconductor devices with improved characteristics. For example, there is an increasing demand for semiconductor devices with high reliability, high performance, and/or multiple functions. To meet this demand, structural complexity and/or integration density of semiconductor devices are being increased.

SUMMARY

It is an aspect to provide a method of improving reliability in an EUV lithography process, which is performed to fabricate a semiconductor device.

According to an aspect of one or more embodiments, a method may include, in a first layout, grouping pattern regions, which have duplicate layout patterns, as a group, each of the pattern regions comprising a weak region in which a random defect may occur when an extreme ultraviolet (EUV) lithography process is performed; calculating defect probabilities of the pattern regions, respectively; calculating a defect frequency and a defect rate of the group based on the defect probabilities of the pattern regions; predicting a degree of defects of a second layout of the pattern regions, based on the defect frequency and the defect rate; and performing an EUV lithography process on a substrate, based on the second layout. The calculating of the defect probabilities comprises, for each pattern region, performing an optical proximity correction (OPC) simulation on the pattern region; calculating a stochastic variation of a linewidth of a simulation pattern in the weak region as a Gaussian distribution; and defining a threshold linewidth, which is used as a reference of the random defect, in the Gaussian distribution.

According to another aspect of one or more embodiments, a method may include searching for a pattern region in a first layout that includes a weak region in which a random defect may occur when an extreme ultraviolet (EUV) lithography process is performed; performing an optical proximity correction (OPC) simulation on the pattern region; calculating a stochastic variation of a linewidth of a simulation pattern in the weak region as a Gaussian distribution; defining a threshold linewidth as a reference of the random defect; applying the threshold linewidth to the Gaussian distribution to calculate a defect probability of the pattern region; searching for the pattern region in a second layout to predict a degree of defects of the second layout; and performing an EUV lithography process on a substrate, based on the second layout.

According to yet another aspect of one or more embodiments, a method may include, in a first layout, grouping first pattern regions which have duplicate first layout patterns as a first group and grouping second pattern regions which have duplicate second layout patterns as a second group, the duplicate second layout patterns being different from the duplicate first layout patterns; calculating first defect probabilities of the first pattern regions, respectively; calculating second defect probabilities of the second pattern regions, respectively; calculating a first defect frequency and a first defect rate of the first group using the first defect probabilities; calculating a second defect frequency and a second defect rate of the second group using the second defect probabilities; and predicting defects in an extreme ultraviolet (EUV) lithography process based on the first defect frequency, the first defect rate, the second defect frequency, and the second defect rate.

DETAILED DESCRIPTION

Various example embodiments will now be described more fully with reference to the accompanying drawings, in which example embodiments are shown.

Figure 1:
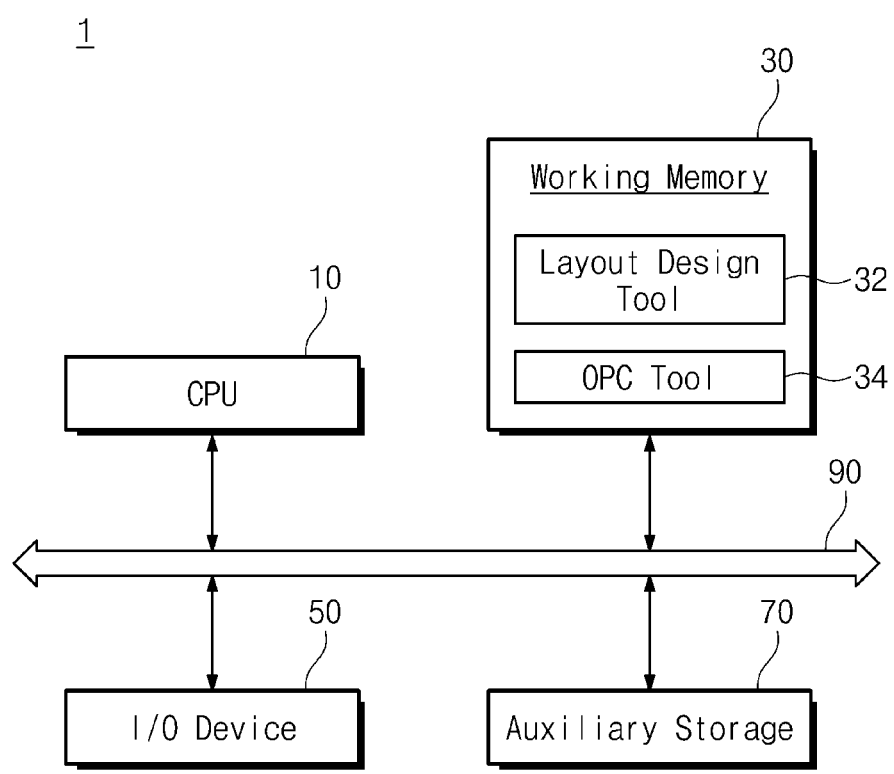
FIG. 1 is a block diagram illustrating a computer system for performing a semiconductor design process, according to an embodiment.

FIG. 1 is a block diagram illustrating a computer system for performing a semiconductor design process, according to an embodiment. Referring to FIG. 1, a computer system 1 may include a central processing unit (CPU) 10, a working memory 30, an input-output (I/O) device 50, and an auxiliary storage 70. In an embodiment, the computer system 1 may be a system which is customized to perform a layout design process according to various embodiments. Furthermore, the computer system 1 may be configured to include various design and check simulation programs.

The CPU 10 may be configured to run a variety of software programs, such as application programs, operating systems, and device drivers, which will be executed in the computer system. For example, the CPU 10 may be configured to run an operating system (OS) (not shown) loaded in the working memory 30. Furthermore, the CPU 10 may be configured to run various application programs, which will be executed on the operating system (OS). For example, the CPU 10 may be configured to run a layout design tool 32 and/or an optical proximity correction (OPC) tool 34 loaded in the working memory 30.

The operating system or application programs may be loaded in the working memory 30. For example, when the computer system starts a booting operation, an image (not shown) of the operating system stored in the auxiliary storage 70 may be loaded in the working memory 30 based on a booting sequence. Overall input/output operations of the computer system may be managed by the operating system (OS). An application program, which is chosen by a user or is provided for basic services, may be loaded in the working memory 30. For example, the layout design tool 32 and/or the OPC tool 34 may be loaded in the working memory 30 from the auxiliary storage 70.

The layout design tool 32 may provide a biasing function capable of changing shapes and positions of specific layout patterns to be different from those defined by a design rule. The layout design tool 32 may be configured to perform a design rule check (DRC) under the changed condition for the bias data. The OPC tool 34 may be configured to perform an optical proximity correction (OPC) process on layout data, which is output from the layout design tool 32. The working memory 30 may be one of volatile memory devices (e.g., static random access memory (SRAM) or dynamic random access memory (DRAM) devices) or nonvolatile memory devices (e.g., PRAM, MRAM, ReRAM, FRAM, NOR FLASH memory devices), or the like.

The input-output (I/O) device 50 may be configured to control data to be input and output through a user interface device. For example, the input-output device 50 may include a keyboard or a monitor which is used to receive relevant information from a designer. By using the input-output device 50, it may be possible for the designer to receive information on semiconductor regions or data paths requiring adjusted operating characteristics. The input-output device 50 may be configured to display a progressive status or result of a process that is executed by the OPC tool 34.

The auxiliary storage 70 may be provided as a storage medium of the computer system 1. The auxiliary storage 70 may be used to store the application programs, the image of the operating system, and various kinds of data. The auxiliary storage 70 may include one of memory cards (e.g., MMC, eMMC, SD, MicroSD, and so forth), a hard disk drive (HDD), or a solid state drive (SSD). In an embodiment, the auxiliary storage 70 may include a NAND FLASH memory device with a large memory capacity. In an embodiment, the auxiliary storage 70 may include next-generation non-volatile memory devices (e.g., PRAM, MRAM, ReRAM, and FRAM devices) or a NOR FLASH memory device, or the like.

A system interconnector 90 may be a system bus provided for an internal network of the computer system. The CPU 10, the working memory 30, the input-output device 50, and the auxiliary storage 70 may be electrically connected to each other through the system interconnector 90 to exchange data with each other. However, the structure of the system interconnector 90 is not limited to this example and, in some embodiments, the system interconnector 90 may further include an interconnection element provided for efficient management.

Figure 2:
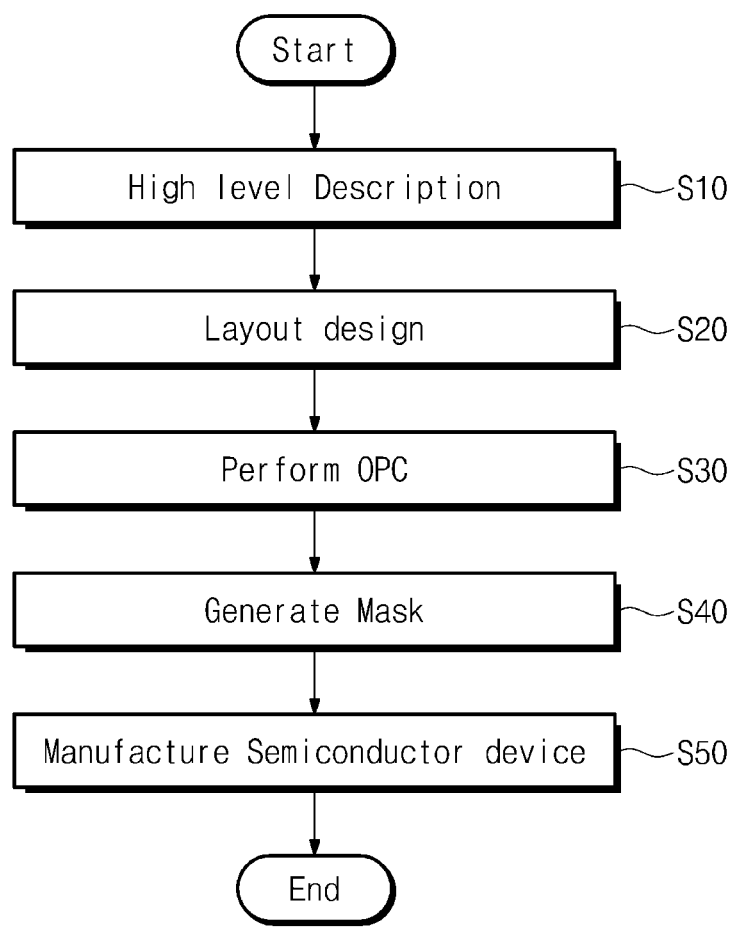
FIG. 2 is a flow chart illustrating a method of designing and fabricating a semiconductor device, according to an embodiment.

FIG. 2 is a flow chart illustrating a method of designing and fabricating a semiconductor device, according to an embodiment. Referring to FIG. 2, a high-level description process may be performed (in S10). A high-level design of a semiconductor integrated circuit may be performed using the computer system 1 described with reference to FIG. 1. For example, in the high-level description process, an integrated circuit to be designed may be described with high-level computer language. An example of the high-level computer language may be a C language. Circuits designed by the high-level design process may be more concretely described by a register-transfer-level (RTL) coding or a simulation. Furthermore, codes generated by the RTL coding may be converted into a netlist and may be combined to describe the entirety of the semiconductor device. The combined schematic circuit may be verified by a simulation tool, and an adjusting step may be further performed based on a result of the verification step.

A layout design process may be performed (in S20). The layout design process may be performed to realize the semiconductor integrated circuit of a logically complete form on a silicon wafer. For example, the layout design process may be performed, based on the schematic circuit prepared in the high-level description process or the corresponding netlist. The layout design process may include a routing step of placing and connecting various standard cells that are provided from a cell library, based on a design rule. The design rule may be predetermined.

The cell library for the layout design process may contain information on operation, speed, and power consumption of standard cells. In an embodiment, a cell library for representing a circuit of a specific gate level as a layout may be defined in the layout design tool. Here, the layout may be prepared to define shapes, positions, or sizes of patterns constituting transistors and metal lines, which will be actually formed on a silicon wafer. For example, in order to actually form an inverter circuit on a silicon wafer, layout patterns (e.g., PMOS, NMOS, N-WELL, gate electrodes, and metal lines thereon) may be appropriately placed. For this placement, at least one of inverters, which were previously defined in the cell library, may be searched and chosen.

The routing step may be performed on the chosen and placed standard cells. In detail, the routing step may be performed to connect the chosen and placed standard cells to upper-level lines. As a result of the routing step, the standard cells may be connected to each other in a designed manner. In an embodiment, the afore-described steps may be automatically or manually performed by the layout design tool 32. In an embodiment, a step of placing and routing the standard cells may be performed using an additional Place & Routing tool.

After the routing step, a verification step may be performed on the layout to check whether there is a portion violating the design rule. In an embodiment, the verification step may include evaluating verification items, such as a design rule check (DRC), an electrical rule check (ERC), and a layout vs schematic (LVS) check. The evaluating of the DRC item may be performed to evaluate whether the layout meets the design rule. The evaluating of the ERC item may be performed to evaluate whether there is an issue of electrical disconnection in the layout. The evaluating of the LVS item may be performed to evaluate whether the layout is prepared to coincide with the gate-level netlist.

An optical proximity correction (OPC) process may be performed (in S30) using an OPC technology. Layout patterns, which are prepared by the layout design process, may be realized on a silicon wafer through a photolithography process. The OPC process may be performed to correct an optical proximity or distortion effect, which may occur in the photolithography process. That is, by performing the OPC process, it may be possible to correct optical effects (e.g., refraction) or process effects, which may occur in an exposure step using a designed pattern. As a result of the OPC process, the shapes and positions of patterns in the designed layout may be changed or biased. The OPC process may be performed using the OPC tool 34. The OPC process will be described in more detail with reference to FIG. 3.

A mask may be generated (in S40). In more detail, a photomask may be manufactured, based on the layout modified by the OPC process (in S40). In general, the photomask may be manufactured by patterning a chromium layer, which is formed on a glass substrate, to describe the layout patterns.

A semiconductor device may be manufactured (in S50). In more detail, the manufactured photomask may be used to manufacture a semiconductor device. In the actual fabricating process using the photomask, various exposing and etching steps may be performed or repeated. As a result of the various exposing and etching steps, patterns, which are defined in the layout design process, may be sequentially formed on a silicon wafer.

Figure 3:
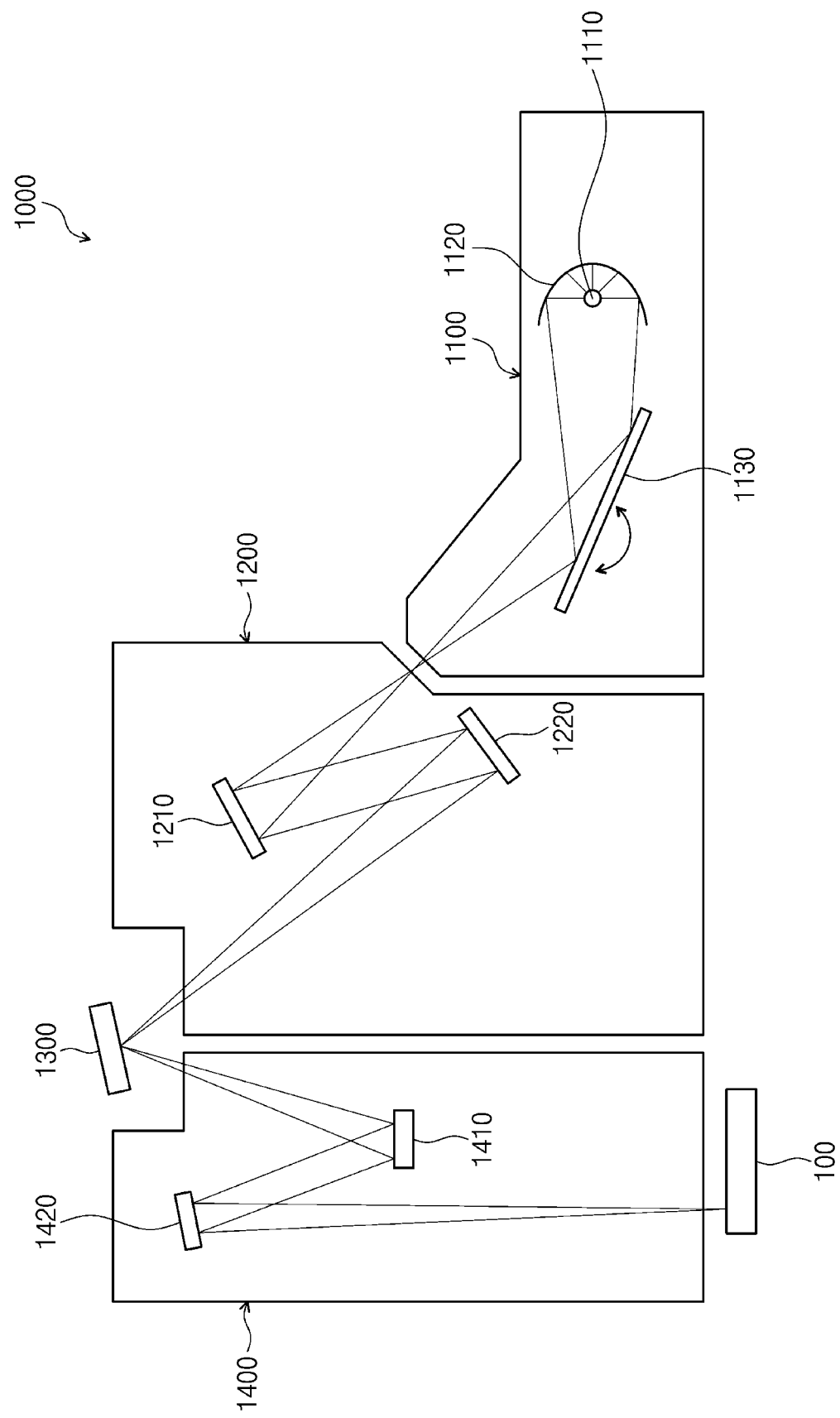
FIG. 3 is a conceptual diagram illustrating a photolithography system using a photomask according to an embodiment.

FIG. 3 is a conceptual diagram illustrating a photolithography system using a photomask according to an embodiment. In detail, FIG. 3 illustrates an example of an extreme ultraviolet (EUV) lithography system 1000.

In an embodiment, EUV light may have a wavelength of about 4 nm to about 124 nm (in particular, of about 4 nm to about 20 nm) and may be, for example, an ultraviolet light having a wavelength of 13.5 nm. The EUV light may have an energy of about 6.21 eV to about 124 eV (in particular, of about 90 eV to about 95 eV).

In general, an amount of photons per unit volume in the EUV light may be much smaller than that in the conventional KrF or ArF light. Since, for the EUV light, an intensity of a single photon is high but an amount of photons is small, at least a portion of an EUV resist layer on a wafer may not sufficiently react with the EUV light. Such a process defect may randomly occur during the EUV lithography process.

Referring to FIG. 3, the EUV lithography system 1000 may include a beam shaping system 1100, an illumination system 1200, a photomask 1300, and a projection system 1400. The beam shaping system 1100, the illumination system 1200, and the projection system 1400 may be disposed in respective housings. In an embodiment, the entirety or portion of the beam shaping system 1100 may be incorporated into the illumination system 1200.

The beam shaping system 1100 may include a light source 1110, a collector 1120, and a monochromator 1130. The light source 1110 may be a laser plasma source, a gas discharging source, or a synchrotron-based radiation source. Light, which is generated by the light source 1110, may have a wavelength range of about 5 nm to about 20 nm. The illumination system 1200 and the projection system 1400 may be configured to be operated within the wavelength range. EUV light, which is emitted from the light source 1110, may be focused by the collector 1120. The monochromator 1130 may be configured to filter out unwanted wavelengths of light.

The EUV light whose wavelength and spatial distribution are adjusted in the beam shaping system 1100 may be incident into the illumination system 1200. FIG. 3 illustrates an example in which the illumination system 1200 includes two mirrors 1210 and 1220. However, the number of the mirrors 1210 and 1220 is not limited to the number of mirrors illustrated in the example of FIG. 3 and, in some embodiments, the number of mirrors may be more or less than two. Each of the mirrors 1210 and 1220 may be a multilayer mirror.

Due to the mirrors 1210 and 1220 in the illumination system 1200, the EUV light may be incident into the photomask 1300. The photomask 1300 may include image patterns, which are used to print or realize a designed layout on a substrate 100. The image patterns may be formed, based on layout patterns prepared through the layout design and optical proximity correction processes described above. The image patterns may be defined by a reflection region reflecting the EUV light and an absorption region absorbing the EUV light. More specifically, the image patterns may include absorption patterns, which are formed on a reflection layer of the photomask 1300. The absorption patterns may be formed of or include at least one of metal compounds (e.g., TaN, TaBN, or TaBON) which absorb but do not reflect the EUV light.

The incident EUV light may be reflected by the photomask 1300. The reflected portion of the EUV light may be projected onto the substrate 100, which is coated with a photoresist composite, through the projection system 1400. The projection system 1400 may be configured to irradiate the EUV light, which is reflected by the photomask 1300, onto the substrate 100 coated with the photoresist composite. A patterned structure may be imaged in the photoresist composite by the EUV irradiated onto the substrate 100. FIG. 3 illustrates an example in which the projection system 1400 includes two mirrors 1410 and 1420. However, similar to the illumination system 1200 described above, the number of the mirrors 1410 and 1420 is not limited to the number of mirrors illustrated in the example of FIG. 3 and, in some embodiments, the number of mirrors may be more or less than two. Each of the mirrors 1410 and 1420 may have a multilayer mirror.

As an integration density of a semiconductor device increases, a distance between the image patterns of the photomask 1300 may be reduced, thereby causing a proximity issue such as undesired interference and diffraction. As a result of the proximity issue, the photoresist patterns formed on the substrate 100 may have distorted shapes (i.e., different from those of the image patterns of the photomask 1300). The distortion of the photoresist patterns may lead to a malfunction of an electronic device or circuit that is formed on the substrate 100.

A resolution enhancement technology may be used to prevent the distortion of the photoresist patterns. The optical proximity correction (OPC) technology, which is used in the step S30 of FIG. 2, may be an example of the resolution enhancement technology. According to the OPC technology, the optical distortion issue, which is caused by interference and diffraction, may be predicted prior to forming the electronic device or circuit on the substrate 100 by a simulation process using an OPC model. The designed layout may be corrected or biased, based on the predicted result. Based on the corrected layout, photoresist patterns may be formed on the photomask 1300, and therefore, the photoresist patterns may be formed in desired shapes on the substrate 100.

A layout of a semiconductor device may include a plurality of layers. In an embodiment, the OPC step (i.e., S30 in FIG. 2) may be performed to correct a layout for each of the layers. That is, the OPC step may be independently performed on each of the plurality of layers. A semiconductor device may be fabricated by realizing the plurality of layers on a substrate through a semiconductor process. As an example, a semiconductor device may include a plurality of metal layers, which are stacked to realize a specific circuit.

Figure 4:
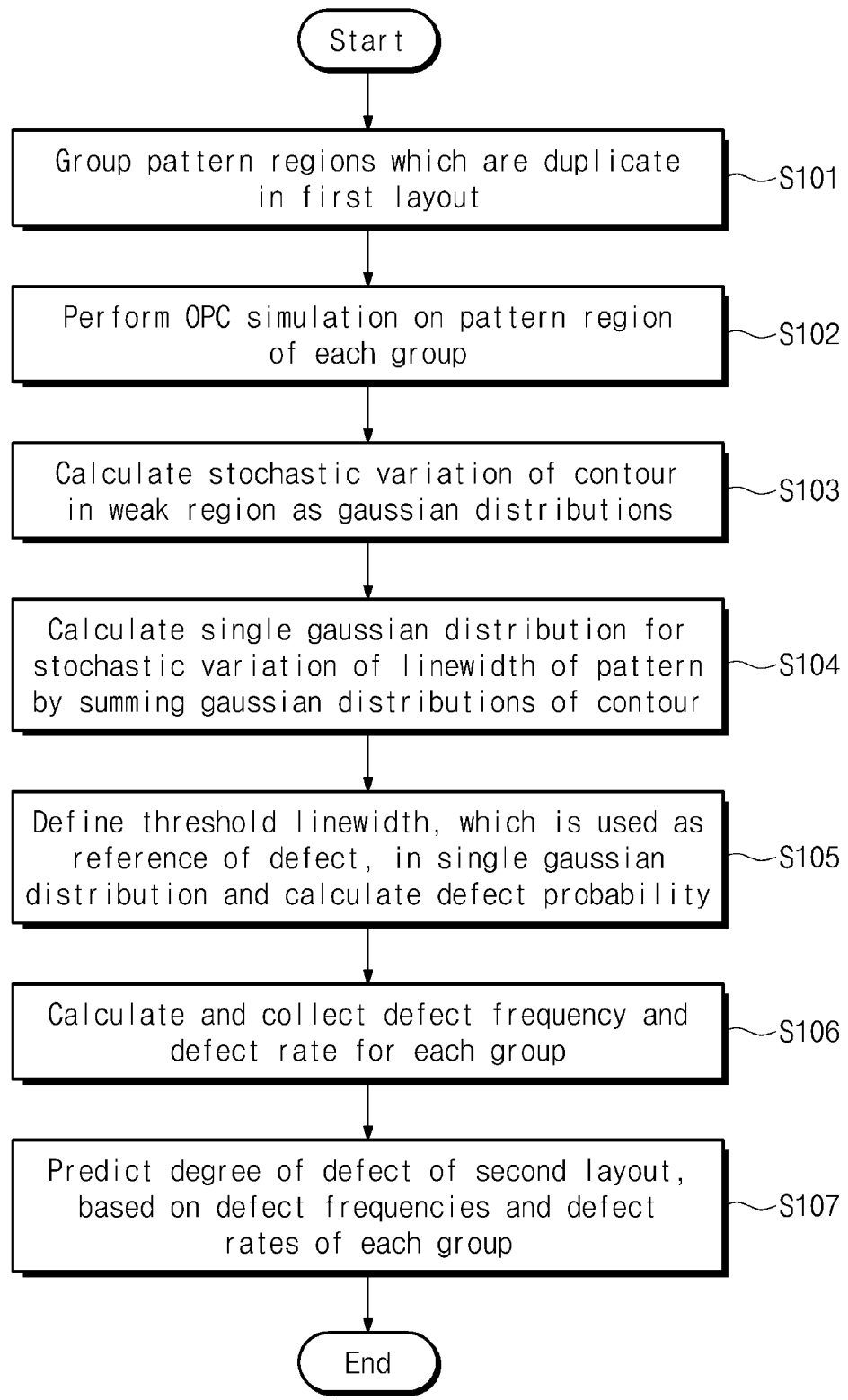
FIG. 4 is a flow chart illustrating a method of designing a semiconductor device according to an embodiment.

FIG. 4 is a flow chart illustrating a method of designing a semiconductor device according to an embodiment. FIGS. 5 to 10 are diagrams illustrating the method of FIG. 4 according to an embodiment. FIG. 4 illustrates a method of predicting defects in an EUV lithography process. More specifically, FIG. 4 relates to a method of numerically representing by numerical data a defect frequency and a defect rate on each of unique pattern groups and predicting a degree of defects in an actual layout based on the numerical data.

Figure 5:
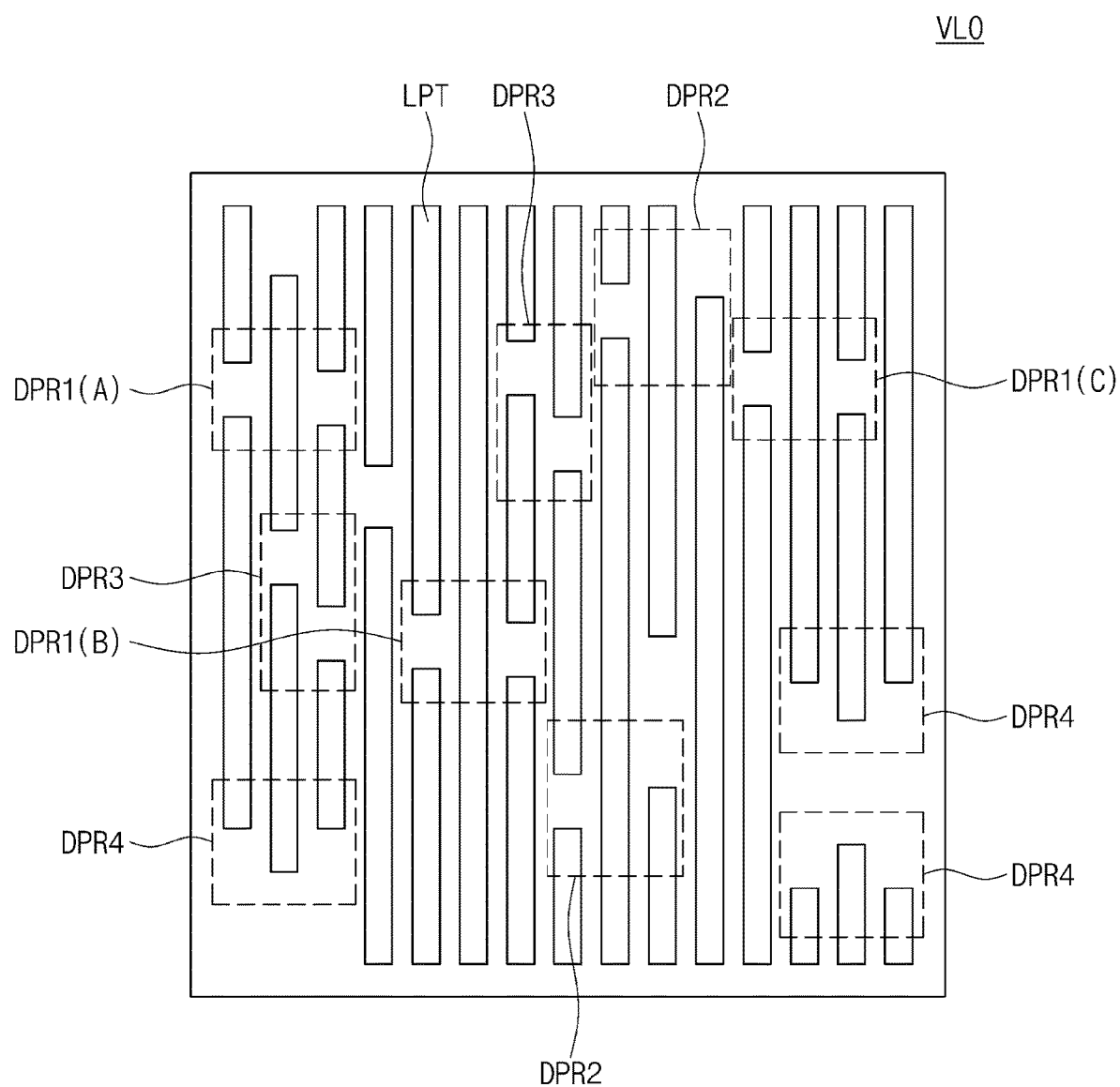
FIGS. 5 to 11 are diagrams illustrating the method of FIG. 4 according to an embodiment.

Referring to FIG. 5 with additional reference to FIG. 4, a first layout VLO may be provided. In an embodiment, the first layout VLO may be a virtual layout, which is generated based on a virtual netlist. The virtual netlist may be created by reducing an actual netlist. The virtual netlist may include a schematic circuit.

In another embodiment, the first layout VLO may be a layout of a semiconductor device that is currently fabricated or is in a mass production stage. That is, the first layout VLO may be a layout used in the past or used in a current fabrication process.

In an embodiment, the first layout VLO may be a layout that represents one of metal or interconnection layers to be formed through a back-end-of-line (BEOL) process. For example, the first layout VLO may be a layout representing one of a first metal layer M1, a second metal layer M2, a third metal layer M3, and additional metal layers (M4, M5, M6, . . . , Mn) thereon.

The first layout VLO may include a plurality of layout patterns LPT. The layout patterns LPT may correspond to interconnection lines, respectively, which are provided in a metal layer corresponding to the first layout VLO. The layout patterns LPT may be line-shaped patterns extending in a specific direction. As an example, the layout patterns LPT may be line-and-space patterns.

Referring now to FIGS. 4 and 5, pattern regions, which are duplicate in the first layout VLO, may be grouped (in S101 of FIG. 4). That is, in the first layout VLO, pattern regions, which have a same layout pattern, may be grouped together in a group. For example, in a region where ends of the layout patterns LPT are located, there may be a unique shape that is composed of the layout patterns LPT. The region with the unique shape may be defined as a pattern region or a unique pattern region.

In an embodiment, the first layout VLO of FIG. 5 may include a first pattern region DPR1, a second pattern region DPR2, a third pattern region DPR3, and a fourth pattern region DPR4. Each of the first to fourth pattern regions DPR1-DP4 may include a plurality of duplicate regions in the first layout VLO.

For example, the first pattern region DPR1 may include a plurality of first pattern regions DPR1 having a same shape. In other words, a configuration of the layout patterns LPT may be the same within the first pattern regions DPR1. In detail, the duplicate first pattern regions DPR1 may include the first pattern region DPR1 located at a position A (DPR1(A)), the first pattern region DPR1 located at a position B (DPR1(B)), and the first pattern region DPR1 located at a position C (DPR1(C)). The three first pattern regions DPR1 located at different positions may be grouped as a first group.

The second pattern region DPR2 may include two second pattern regions DPR2 located at different positions. The second pattern regions DPR2 may be grouped as a second group. The third pattern region DPR3 may include two third pattern regions DPR3 located at different positions. The third pattern regions DPR3 may be grouped as a third group. The fourth pattern region DPR4 may include three fourth pattern regions DPR4 located at different positions. It is noted that the two fourth pattern regions DPR4 in the lower right of FIG. 5 have a same shape but are symmetrical about a horizontal line. The groupings may include such symmetrically same pattern regions. The fourth pattern regions DPR4 may be grouped as a fourth group.

An OPC simulation may be performed on the pattern region of each of the first to fourth groups (in S102 of FIG. 4). Hereinafter, the first group of the first pattern region DPR1 will be described as a representative example. In an embodiment, the OPC simulation may be performed using the OPC tool 34 of FIG. 1.

Figure 6:
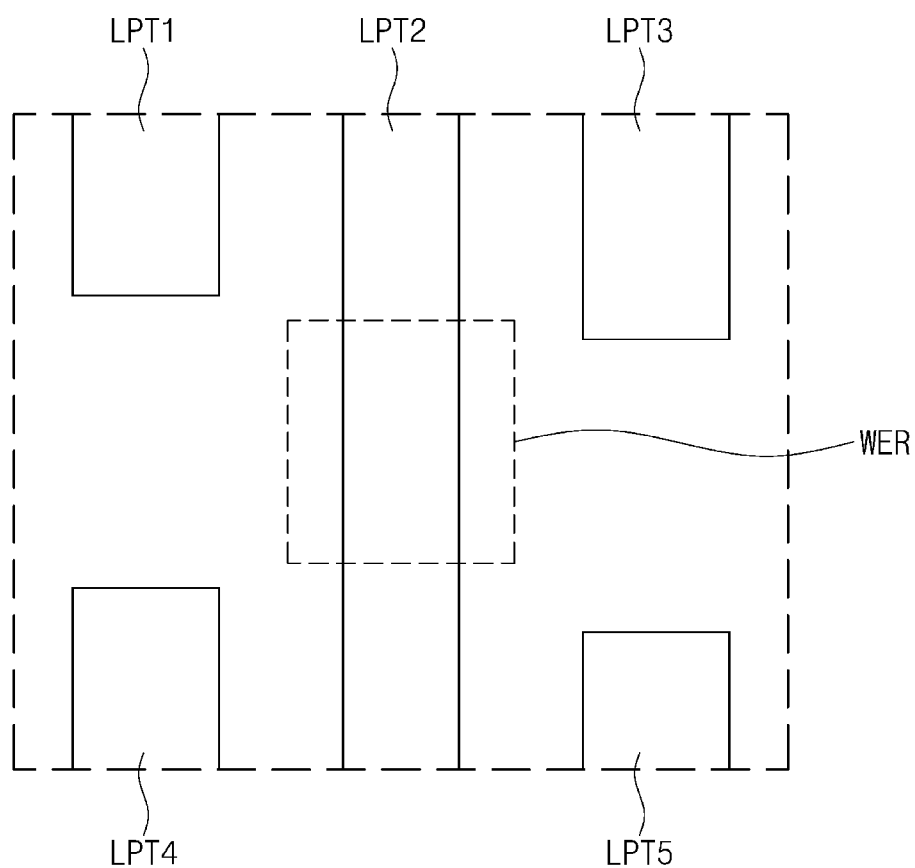

Referring to FIG. 6, the first pattern region DPR1 may include a first layout pattern LPT1, a second layout pattern LPT2, a third layout pattern LPT3, a fourth layout pattern LPT4, and a fifth layout pattern LPT5. The first and fourth layout patterns LPT1 and LPT4 may be spaced apart from each other in a specific direction. The first and fourth layout patterns LPT1 and LPT4 may be aligned to each other in the specific direction. The third and fifth layout patterns LPT3 and LPT5 may be spaced apart from each other in the specific direction. The third and fifth layout patterns LPT3 and LPT5 may be aligned to each other in the specific direction.

The second layout pattern LPT2 may be provided between the first and third layout patterns LPT1 and LPT3 and between the fourth and fifth layout patterns LPT4 and LPT5 as illustrated in FIG. 6. The second layout pattern LPT2 may have a line shape extending in the specific direction.

A weak region WER may be defined on the second layout pattern LPT2. The weak region WER may be located between ends of the first, third, fourth, and fifth layout patterns LPT1, LPT3, LPT4, and LPT5 as illustrated in FIG. 6. The weak region WER may be a region, in which a random defect may occur when the EUV lithography process is performed on a wafer.

Figure 7:
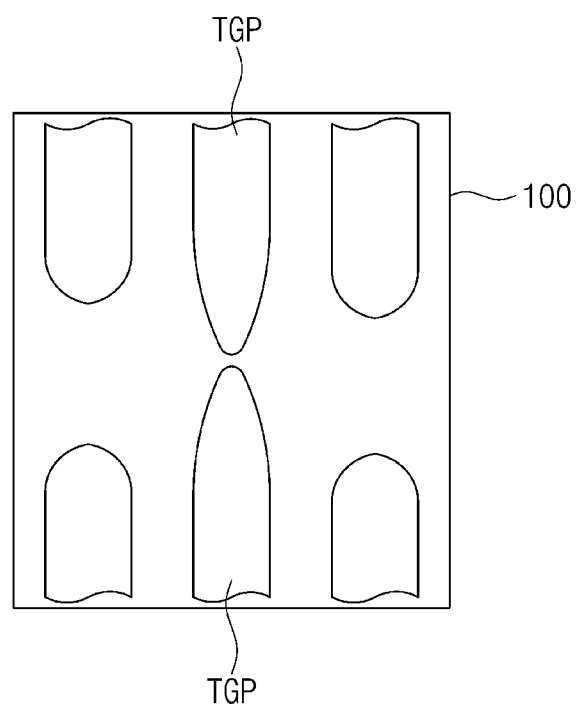

FIG. 7 shows a process defect which may occur when the first to fifth layout patterns LPT1 to LPT5 are actually realized on the substrate 100. Referring to FIG. 7, a target pattern TGP corresponding to the second layout pattern LPT2 may not be formed in a line shape and may be divided into two portions spaced apart from each other. Since, for the EUV light in the EUV lithography process, an amount of photons per unit volume is small as described above, a single line open (SLO) defect, in which a line pattern is cut, may occur, as shown in FIG. 7. The SLO defect of FIG. 7 may be a defect that occurs randomly. This random defect may occur in the weak region WER described above.

The random defect of FIG. 7 may be a defect which is found not always but is found randomly in a stochastic aspect. Thus, according to an embodiment, it may be possible to quantitatively predict the random defect, which will occur when the unique pattern region is realized on an actual wafer, for each group.

Figure 8A:
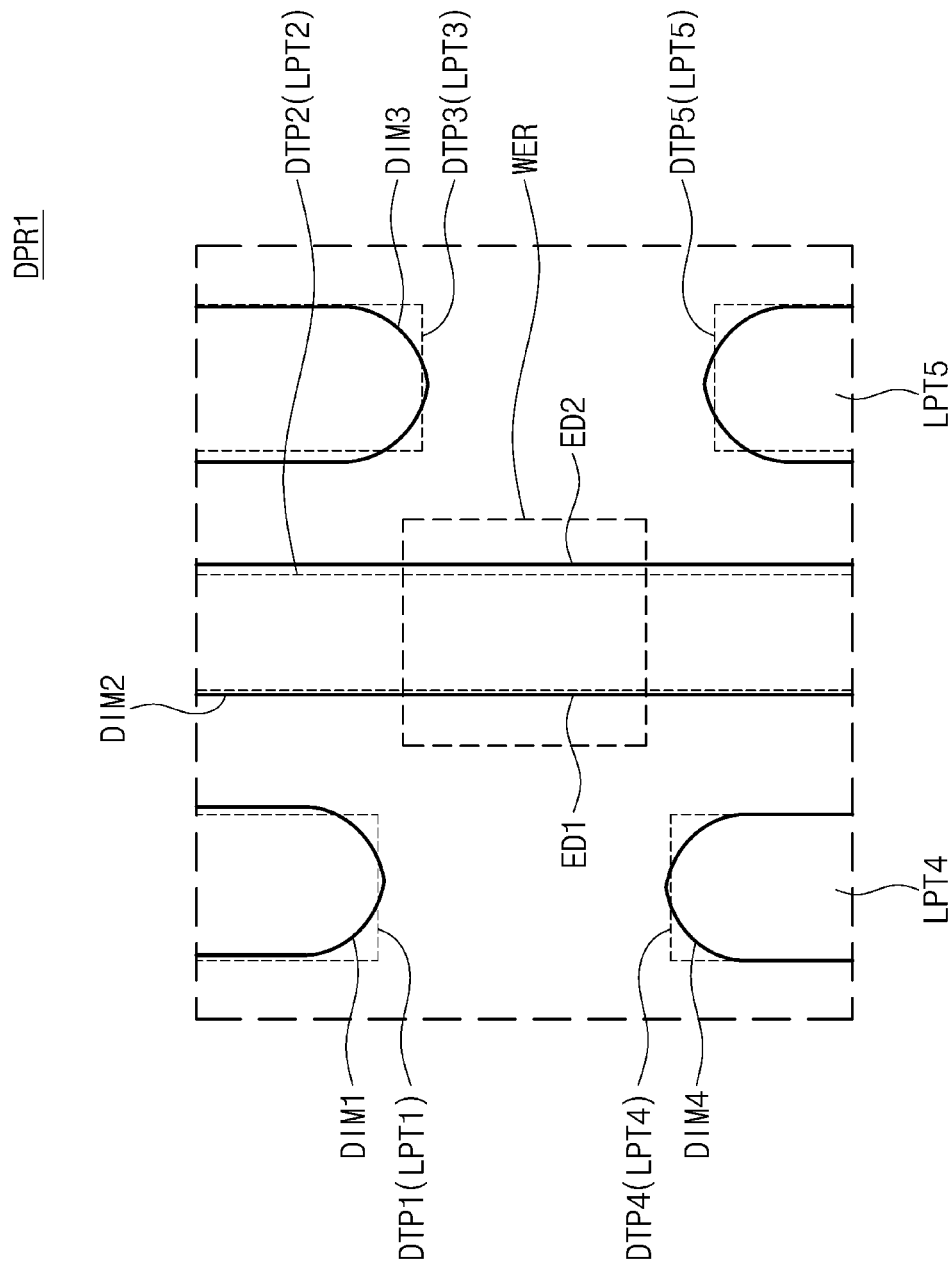

Referring to FIG. 8A, the OPC simulation may be performed on the first pattern region DPR1 to generate a first simulation pattern DIM1, a second simulation pattern DIM2, a third simulation pattern DIM3, a fourth simulation pattern DIM4, and a fifth simulation pattern DIM5 corresponding to the first to fifth layout patterns LPT1 to LPT5, respectively.

In detail, a first target pattern DTP1, a second target pattern DTP2, a third target pattern DTP3, a fourth target pattern DTP4, and a fifth target pattern DTP5 may be respectively generated on the first to fifth layout patterns LPT1 to LPT5. Each of the first to fifth target patterns DTP1 to DTP5 may be generated from a corresponding layout pattern through a table-driven layout operation (TDLO) step. Each of the first to fifth target patterns DTP1 to DTP5 may define a size of a pattern, which is developed from an EUV resist layer through the EUV lithography process. Each of the first to fifth target patterns DTP1 to DTP5 may denote a desired size of a photoresist pattern that is developed through the EUV lithography process. Each of the first to fifth target patterns DTP1 to DTP5 may have a size that is the same as or different from a correspond layout pattern.

The first to fifth simulation patterns DIM1 to DIM5 may be generated by performing an OPC process, which aims at the first to fifth target patterns DTP1 to DTP5, on the first to fifth layout patterns LPT1 to LPT5. For example, the first to fifth simulation patterns DIM1 to DIM5 may be generated to maximally correspond with the first to fifth target patterns DTP1 to DTP5, respectively.

In the weak region WER, a contour of the second simulation pattern DIM2 may include a first edge ED1 and a second edge ED2 which are opposite to each other. The first and second edges ED1 and ED2 of FIG. 8A may have a linear shape. However, as described above, a shape of a pattern in the weak region WER may be randomly deformed, due to a limitation in the EUV lithography process. In an ultimate deformation case, the defect shown in FIG. 7 may occur in the weak region WER. That is, there may be a non-vanishing probability that the contour of the second simulation pattern DIM2 in the weak region WER has a shape different from that of FIG. 8A.

Figure 8B:
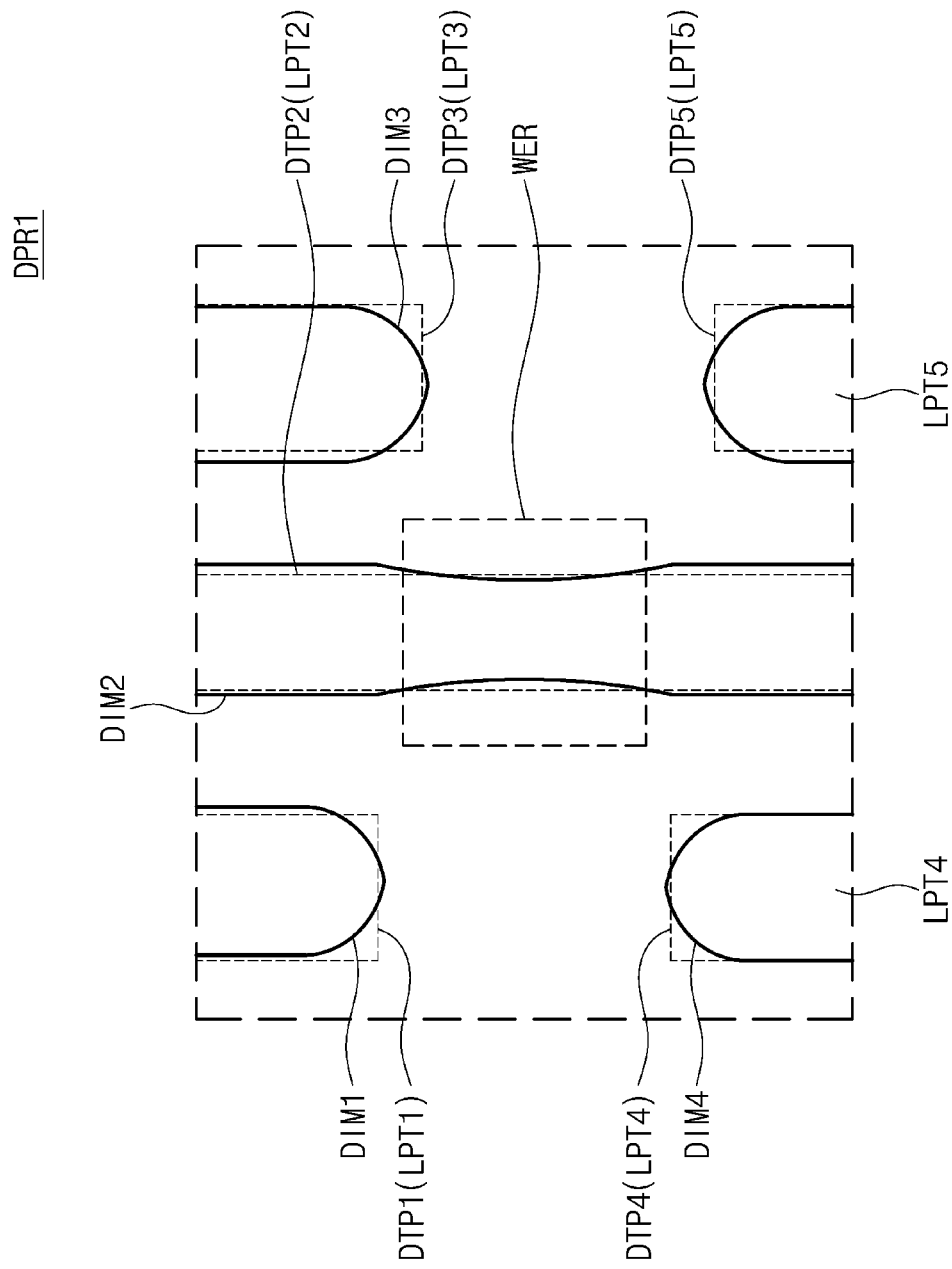
Figure 8C:
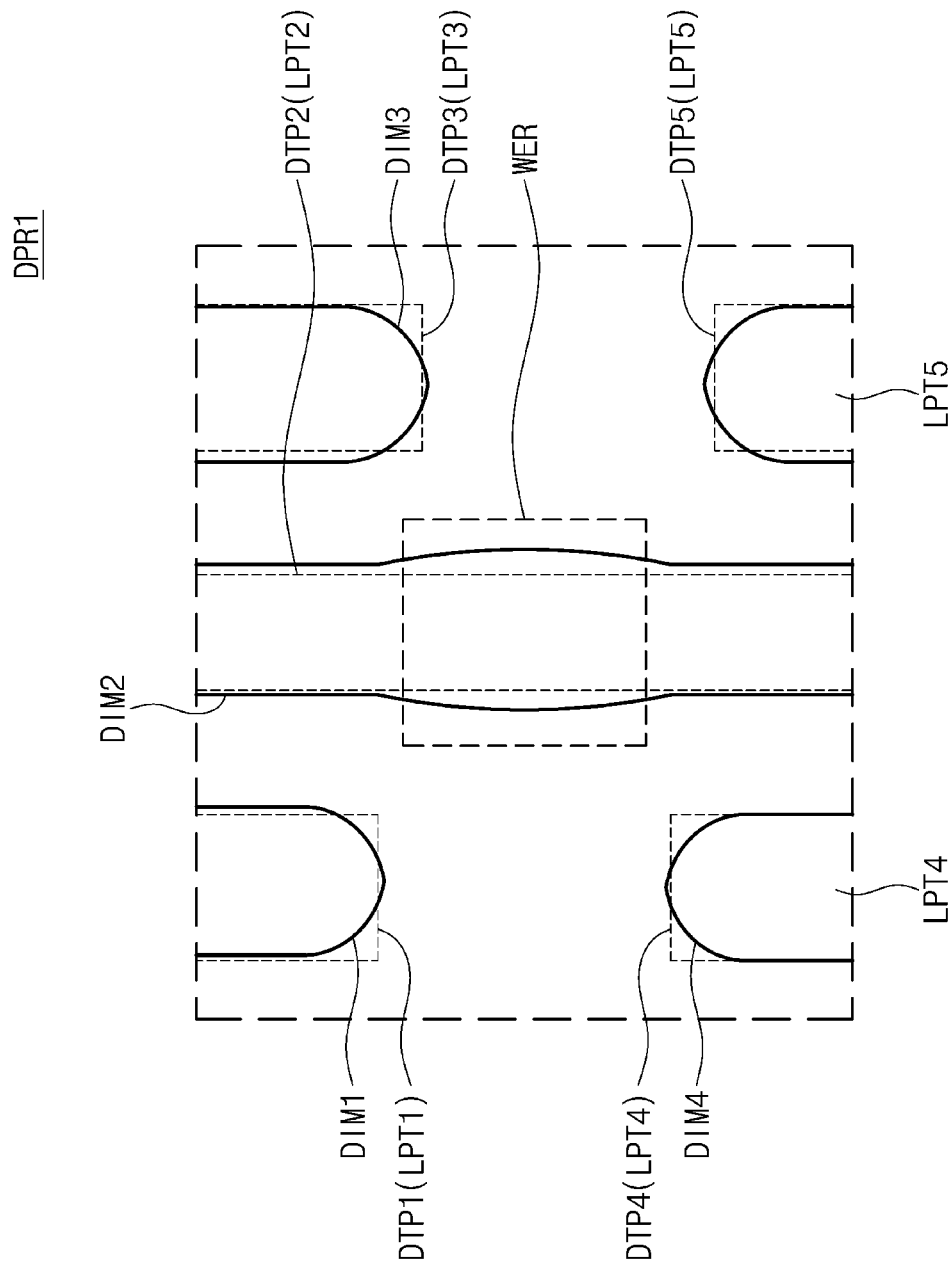

Referring to FIG. 8B, the first and second edges ED1 and ED2 may have a shape that is recessed toward a center of the second simulation pattern DIM2. Referring to FIG. 8C, the first and second edges ED1 and ED2 may have a shape that is convex in a direction away from the center of the second simulation pattern DIM2. When FIG. 8A is chosen as a reference, there may be a non-vanishing probability that each of the first and second edges ED1 and ED2 has the deviation or displacement shown FIG. 8B or FIG. 8C.

Figure 9:
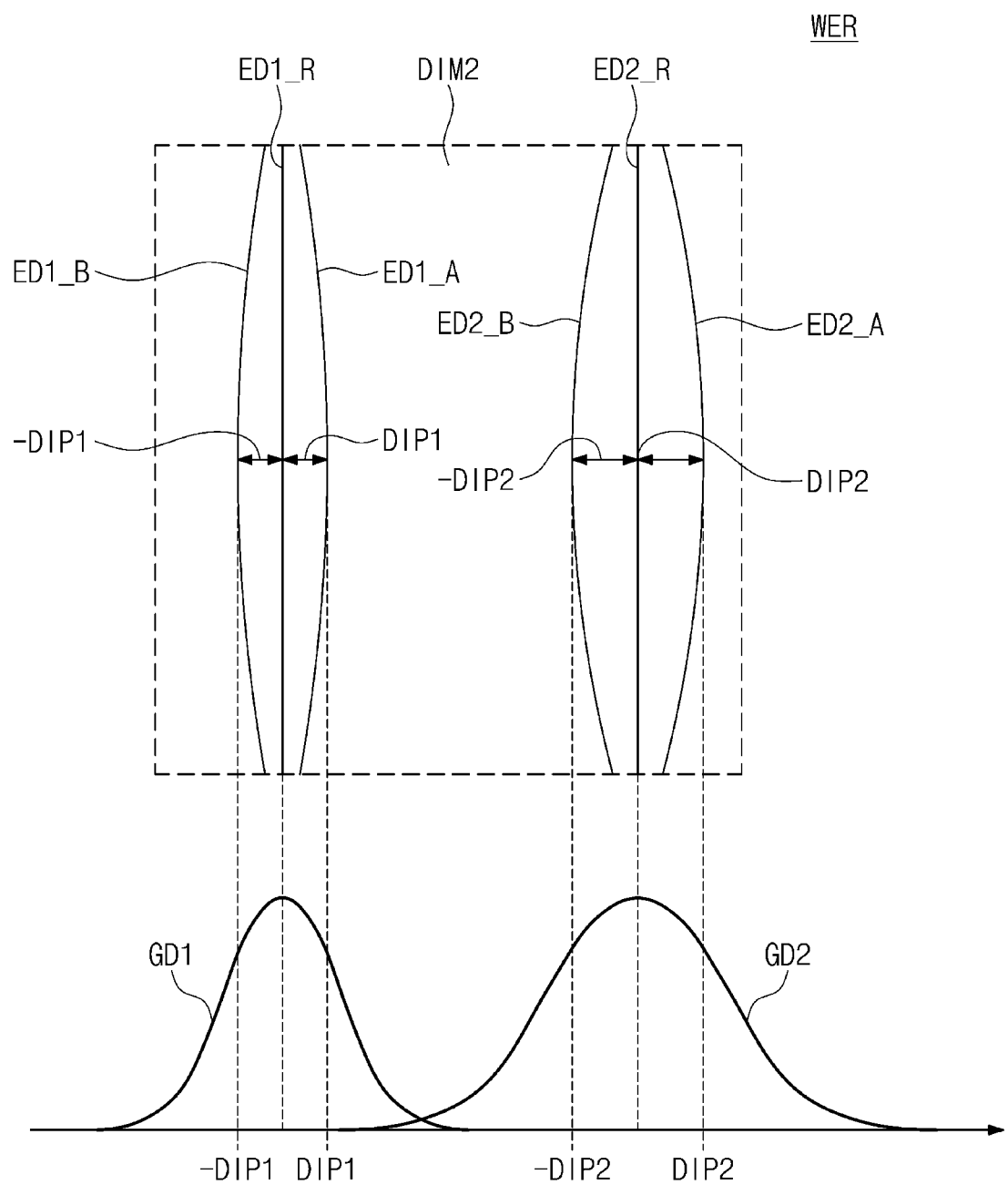

Referring to FIG. 9, a variation of the contour of the second simulation pattern DIM2 in the weak region WER may be calculated as Gaussian distributions (in S103 of FIG. 4). In detail, a stochastic variation related to a deviation of the first edge ED1 may obey a first Gaussian distribution GD1 whose center is located at a first reference edge ED1_R of FIG. 8A. The first edge ED1 may be located at the first reference edge ED1_R with the highest probability. The first edge ED1 may be located at a first positive edge ED1_A, which has a first deviation DIP1 from the first reference edge ED1_R, with a lowered probability. The first edge ED1 may be located at a first negative edge ED1_B, which has a minus value of the first deviation (i.e., -DIP1) from the first reference edge ED1_R, with a lowered probability. The deviations DIP and -DIP1 may be the standard deviation of the first Gaussian distribution GD1. In other words, the first edge ED1 may have a stochastic variation band (SVB) in accordance with the first Gaussian distribution GD1.

The second edge ED2 may also have a stochastic variation band in a similar manner as the first edge ED1 described above. In detail, the second edge ED2 may have a stochastic variation band in accordance with a second Gaussian distribution GD2. In other words, the second edge ED2 may be located at a second reference edge ED2_R of FIG. 8A with the highest probability. The second edge ED2 may be located at a second positive edge ED2_A, which has a second deviation DIP2 from the second reference edge ED2_R, with a lowered probability. The second edge ED2 may be located at a second negative edge ED2_B, which has a minus value of the second deviation (i.e., -DIP2) from the second reference edge ED2_R, with a lowered probability.

As shown in FIG. 9, a contour in the weak region WER (i.e., each of the first and second edges ED1 and ED2) may not be fixed to a specific reference shape ED1_R or ED2_R but may vary stochastically.

According to an embodiment, the stochastic variation to the contour in the weak region WER described above may be calculated as a Gaussian distribution. The Gaussian distribution of the contour (i.e., the stochastic variation band (SVB)) may be calculated based on the following DMS model:

$$SVB = a*(DMS)^n + b$$

where SVB denotes the stochastic variation band, DMS denotes a dose mask sensitivity, "n" denotes an experimentally determined constant, and "a" and "b" denote optimized values in a regression analysis. The dose mark sensitivity (DMS) is represented by the following expression:

$$DMS = \frac{f(MEEF)}{I_{max} * ILS}$$

The dose mask sensitivity (DMS) model may represent a stochastic variation of the contour in the weak region WER in terms of an EUV dose and a photomask factor. The DMS may be proportional to the photomask factor (f(MEEF)). The DMS may be inversely proportional to an intensity (Imax) of the EUV light and sensitivity (i.e., image log-slope (ILS)) in the EUV process. The sensitivity (ILS) may mean a change ratio of a light intensity at a boundary between an exposed region and an unexposed region in the EUV lithography process.

The higher the values of Imax and ILS, the smaller the value of the DMS and the stochastic variation of the contour. In other words, the DMS may indicate an accuracy in the EUV lithography process. That is, the smaller the value of the DMS, the smaller the variation of the contour ED1 or ED2 shown in FIG. 9. The smaller the value of the DMS, the smaller the standard deviation of the Gaussian distribution GD1 or GD2. The standard deviation DIP1 of the first Gaussian distribution GD1 of FIG. 9 may be smaller than the standard deviation DIP2 of the second Gaussian distribution GD2. For example, the DMS value of the first edge ED1 of FIG. 9 may be smaller than the DMS value of the second edge ED2. In the case where the value of the DMS is small, a defect probability in the weak region WER may be lowered. The first or second Gaussian distribution GD1 or GD2 of FIG. 9 (i.e., SVB) for each contour may be calculated, based on the afore-described DMS model.

Figure 10:
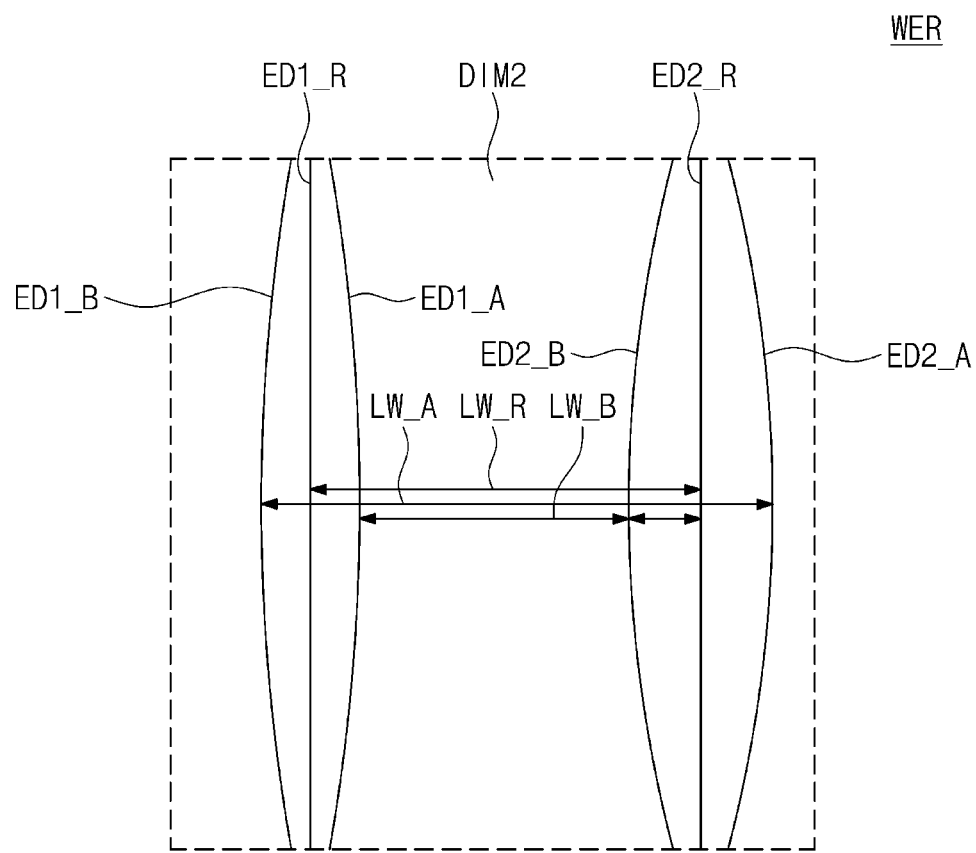
Figure 10:
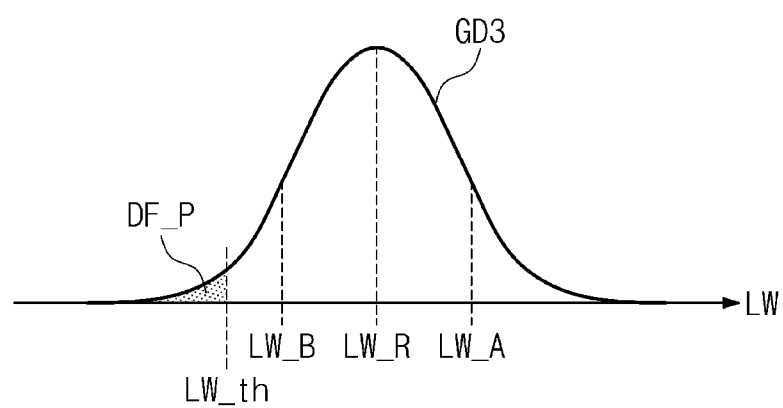

Referring to FIG. 10, a single Gaussian distribution for a stochastic variation of a linewidth of a pattern may be calculated by summing the Gaussian distributions of the contour in the weak region WER (in S104 of FIG. 4). In detail, a third Gaussian distribution GD3, which represents a stochastic variation of a linewidth of a pattern (e.g., the second simulation pattern DIM2), may be calculated by summing the first and second Gaussian distributions GD1 and GD2 of the first and second edged ED1 and ED2 of FIG. 9.

A pattern on the weak region WER (i.e., the second simulation pattern DIM2) may have a reference linewidth LW_R. Since each of the first and second edges ED1 and ED2 varies stochastically, a linewidth of the second simulation pattern DIM2 may also vary stochastically.

For example, the linewidth of the second simulation pattern DIM2 may have the reference linewidth LW_R, with the highest probability. The linewidth of the second simulation pattern DIM2 may have a first linewidth LW_A, which has a third deviation from the reference linewidth LW_R, with a lowered probability. The linewidth of the second simulation pattern DIM2 may have a second linewidth LW_B, which has a minus value of the third deviation from the reference linewidth LW_R, with a lowered probability. In other words, the linewidth of the second simulation pattern DIM2 may have a stochastic variation band (i.e., SVB) in accordance with the third Gaussian distribution GD3.

A threshold linewidth LW_th, which is used as a defect reference in the third Gaussian distribution GD3, may be defined and then a defect probability may be calculated (in S105 of FIG. 4). In the case where a linewidth of a pattern on the weak region WER has a value that is smaller than a specific threshold value, a defect may occur, as shown in FIG. 7. Accordingly, the threshold linewidth LW_th, which is used as a reference of defect occurrence, may be defined. In an embodiment, the threshold linewidth LW_th may be defined or determined in consideration of whether the defect shown in FIG. 7 occurs on an actual wafer when a linewidth of a pattern on the weak region WER is smaller than a specific value.

In the third Gaussian distribution GD3 of FIG. 10, a defect probability DF_P may be calculated by obtaining an area of a graph of the third Gaussian distribution GD3 to the threshold linewidth LW_th. That is, the defect probability DF_P of the first pattern region DPR1 in the weak region WER may be calculated using the afore-described steps.

Even when, as shown in FIG. 5, the first pattern regions DPR1 are provided to have the same shape at the position A, the position B, and the position C, the defect probability of the first pattern region DPR1 may vary depending on the position A, B, or C. This variation may be because the intensity of the EUV light and the sensitivity in the EUV process vary depending on a position on a wafer. Accordingly, it may be advantageous to calculate the defect probabilities of the first pattern regions DPR1 at the positions A, B, and C, respectively. That is, according to an embodiment, the defect probabilities may be calculated for pattern regions, which are located at different positions, in each group.

A defect frequency and a defect rate for each group may be calculated and collected, based on the defect probabilities of the pattern regions calculated by the afore-described methods (in S106 of FIG. 4).

Figure 11:
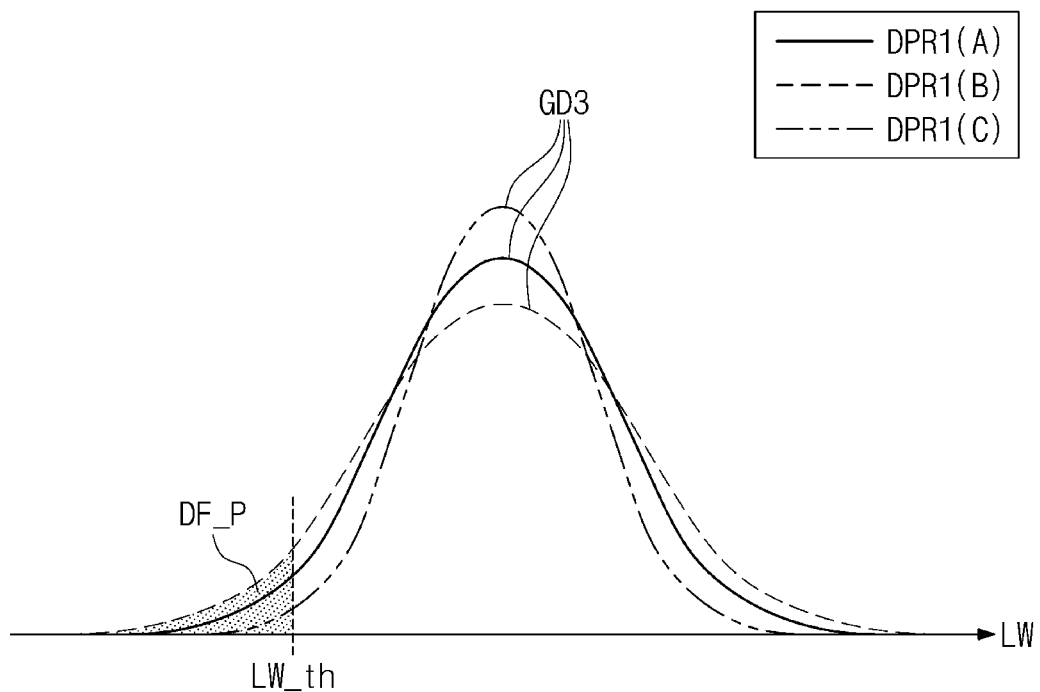

In detail, referring to FIG. 11, the first pattern regions DPR1 at the positions A, B, and C may have respective third Gaussian distributions GD3 that are different from each other. The third Gaussian distribution GD3 of the first pattern region DPR1 at the position A (i.e., DPR1(A)), the third Gaussian distribution GD3 of the first pattern region DPR1 at the position B (i.e., DPR1(B)), and the third Gaussian distribution GD3 of the first pattern region DPR1 at the position C (i.e., DPR1(C)) may have different standard deviations from each other. In other words, a stochastic variation of a linewidth of a first pattern region DP1 in the weak region WER may vary depending on position. Even when the same threshold linewidth LW_th is chosen as reference, the defect probabilities of the first pattern regions DPR1 at the positions A, B, and C may be calculated as, for example, 0.25, 0.35, and 0.15, respectively.

The defect frequency of the first group of the first pattern regions DPR1 may be a sum of the defect probabilities (i.e., 0.75=0.25+0.35+0.15). The defect rate may be a value that is obtained by dividing the defect frequency by the number of the pattern regions (i.e., 0.25=0.75/3). That is, on a wafer, the predicted number of the defects, which occur in association with the first pattern region DPR1, may be 0.75, and a mean defect probability of the first pattern region DPR1 may be 0.25.

Next, the defect probability may also be calculated for the second pattern regions DPR2 of the second group. For example, the defect probability of one of two second pattern regions DPR2 may be 0.30, and the defect probability of the other may be 0.35. Here, the defect frequency of the second group may be 0.65, and the defect rate may be 0.325.

The defect frequency of the second group (i.e., 0.65) may be smaller than the defect frequency of the first group (i.e., 0.75). This difference may be because the number of the second pattern regions DPR2 of the second group (i.e., two) is smaller than the number of the first pattern regions DPR1 of the first group (i.e., three). However, it may be seen that the defect rate of the second group is greater than the defect rate of the first group. Only when both of the defect frequency and the defect rate are calculated for each group as described above may the occurrence of the defect may be predicted more accurately.

A degree of defects of the second layout may be predicted based on the defect frequency and the defect rate calculated or obtained for each groups by the above process (in S107 of FIG. 4). Unlike the first layout VLO of FIG. 4, the second layout may be an actual layout of a semiconductor device which will be produced in the future. Hereinafter, a method of applying information on the defect frequency and the defect rate of the unique patterns or groups to the second layout (i.e., the actual layout) will be described exemplarily.

Figure 12:
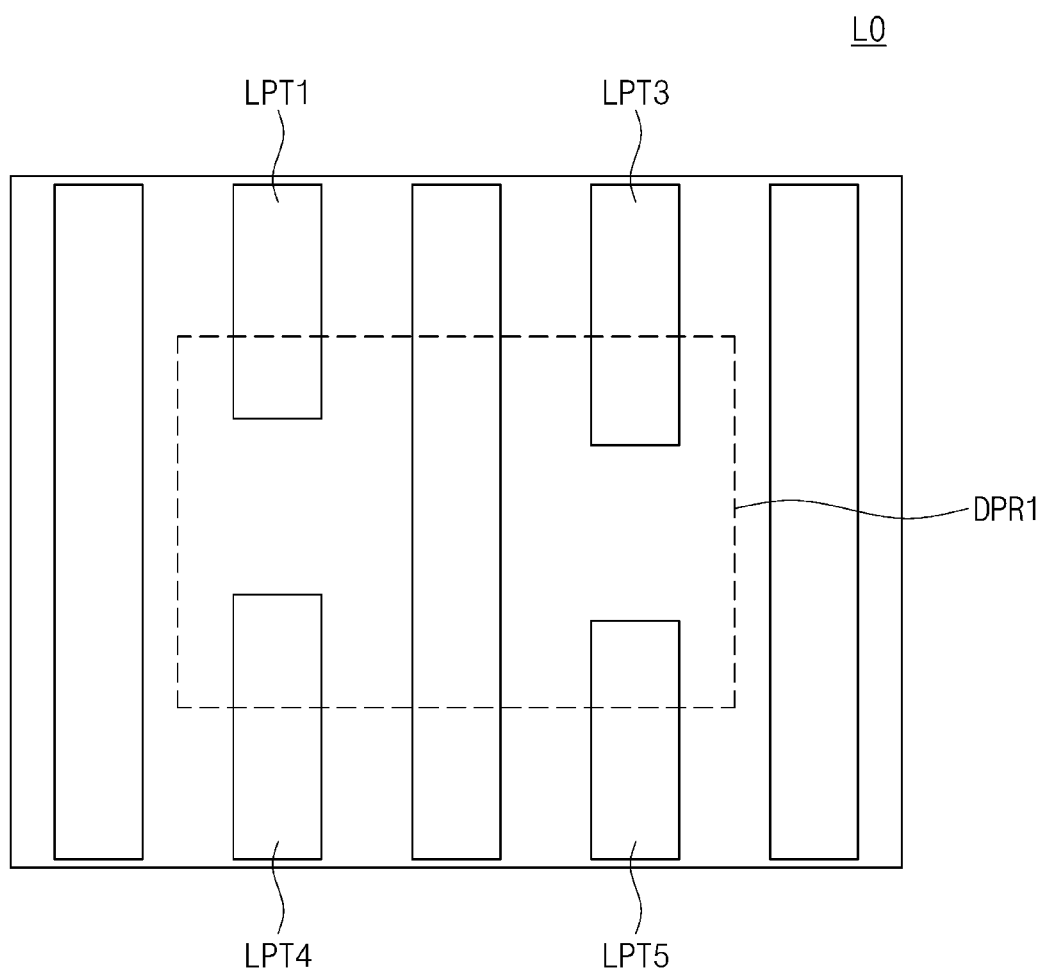
FIGS. 12 and 13 are layout diagrams illustrating a method of designing a semiconductor device according to an embodiment.
Figure 13:
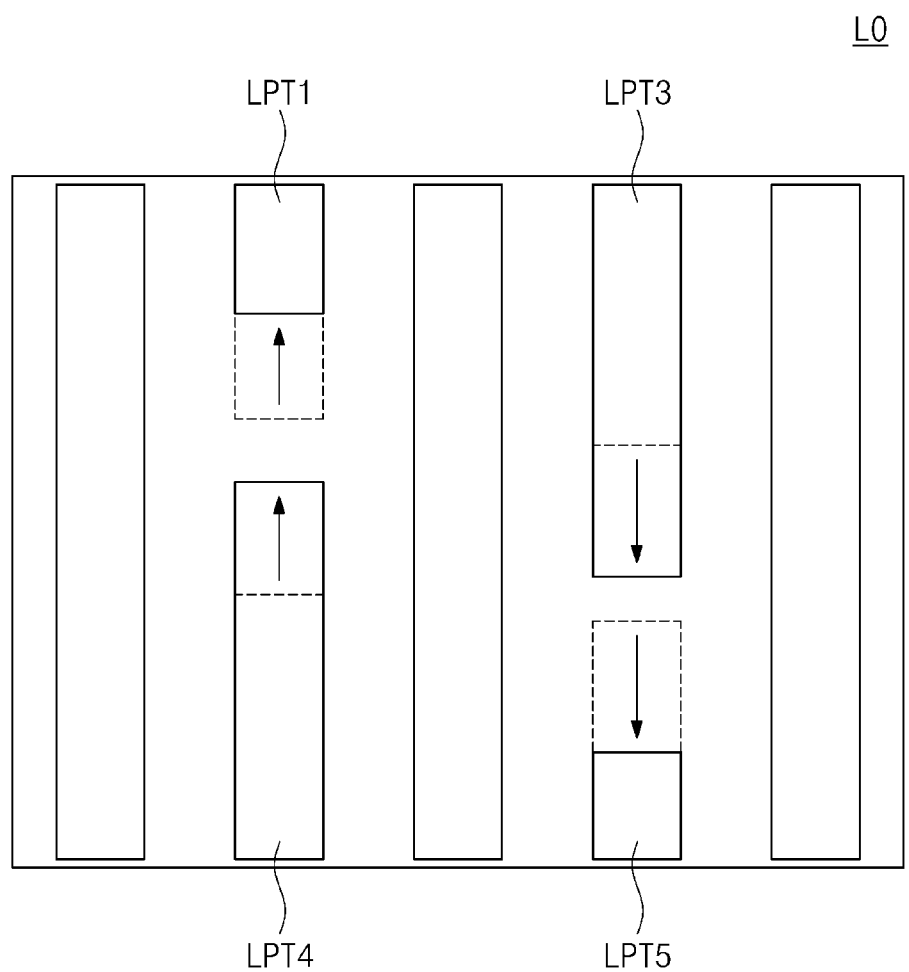

FIGS. 12 and 13 are layout diagrams illustrating a method of designing a semiconductor device according to an embodiment.

Referring to FIG. 12, unique pattern regions in a second layout LO may be searched. A defect frequency and a defect rate of a group, in which the unique pattern regions are grouped, may be calculated and collected in advance through the afore-described method of FIG. 4. For example, the first pattern region DPR1 of the first group may be searched in the second layout LO. This search process may be performed in consideration of a defect probability by a position of the first pattern region DPR1 of FIG. 12 and a defect frequency and a defect rate of the first group, in which the first pattern region DPR1 is included.

Referring to FIG. 13, if a defect is predicted to occur in the first pattern region DPR1 of FIG. 12 with a high probability, the first pattern region DPR1 of the second layout LO may be modified. For example, an end of each of the layout patterns LPT1, LPT3, LPT4, and LPT5 may be modified or biased to lower an occurrence probability of the defect, as shown in FIG. 13.

Figure 14:
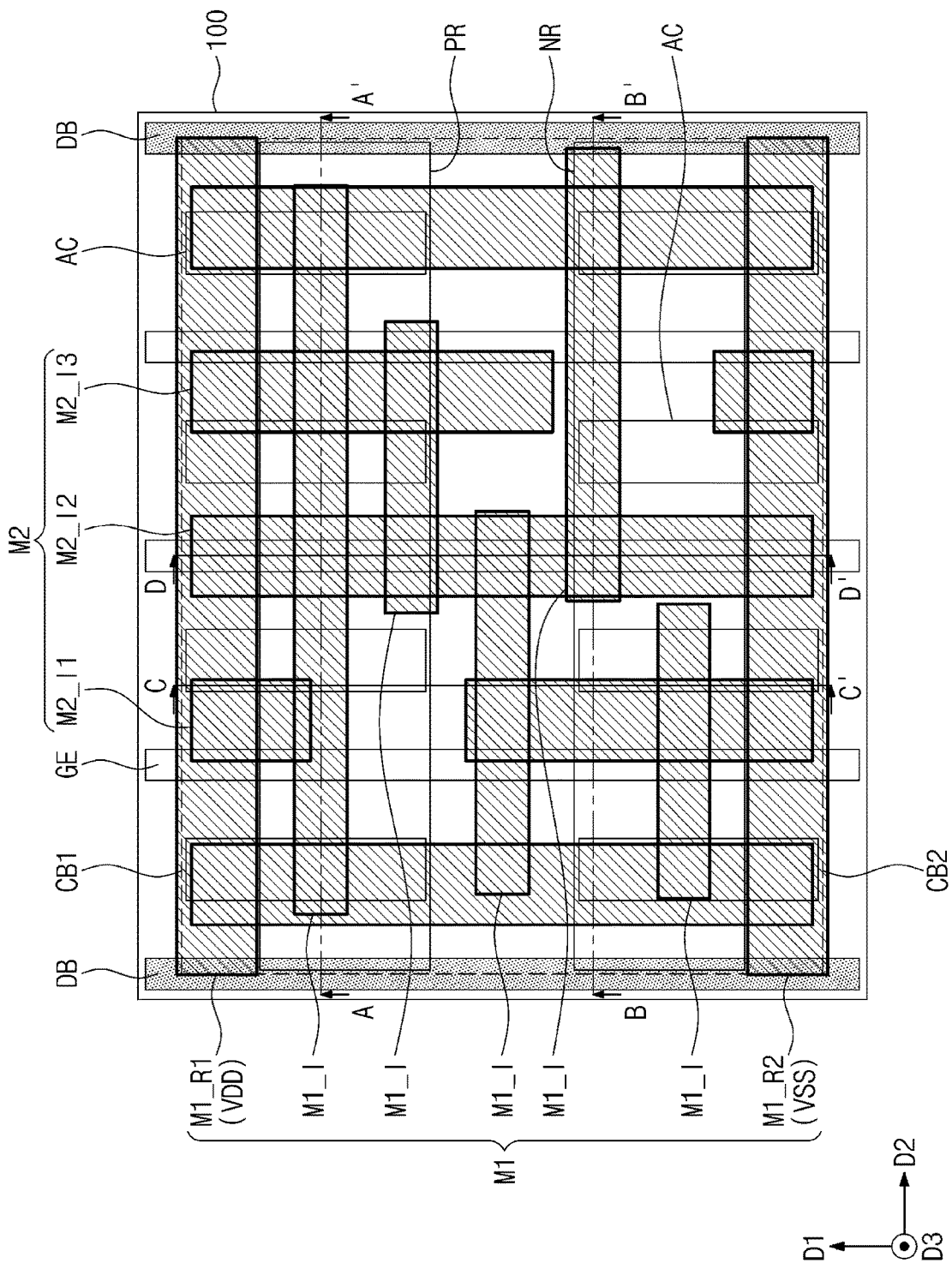
FIG. 14 is a plan view illustrating a semiconductor device according to an embodiment.

FIG. 14 is a plan view illustrating a semiconductor device according to an embodiment. FIGS. 15A to 15D are sectional views taken along lines A-A', B-B', C-C', and D-D', respectively, of FIG. 14. FIGS. 14 and 15A to 15D illustrate an example of a semiconductor device, in which the second layout LO of FIG. 12 is realized as the second metal layer M2 on a substrate.

Referring to FIGS. 14 and 15A to 15D, a logic cell may be provided on the substrate 100. Logic transistors constituting a logic circuit may be disposed on the logic cell.

The substrate 100 may include a first active region PR and a second active region NR. In an embodiment, the first active region PR may be a PMOSFET region, and the second active region NR may be an NMOSFET region. The substrate 100 may be a semiconductor substrate including silicon, germanium, silicon germanium, or the like or a compound semiconductor substrate. In an embodiment, the substrate 100 may be a silicon wafer.

The first and second active regions PR and NR may be defined by a second trench TR2 (see, e.g., FIG. 15C), which is formed in an upper portion of the substrate 100. The second trench TR2 may be located between the first and second active regions PR and NR. The first and second active regions PR and NR may be spaced apart from each other, in a first direction D1, with the second trench TR2 interposed therebetween. Each of the first and second active regions PR and NR may be extended in a second direction D2 that is different from (e.g., perpendicular to) the first direction D1.

First active patterns AP1 and second active patterns AP2 may be provided on the first active region PR and the second active region NR, respectively. The first and second active patterns AP1 and AP2 may be extended in the second direction D2 to be parallel to each other. Each of the first and second active patterns AP1 and AP2 may be a vertically-protruding portion (e.g., protruding in a third direction D3) of the substrate 100. A first trench TR1 may be defined between adjacent ones of the first active patterns AP1 and between adjacent ones of the second active patterns AP2. The first trench TR1 may be shallower than the second trench TR2.

A device isolation layer ST may be provided to fill the first and second trenches TR1 and TR2. The device isolation layer ST may include a silicon oxide layer. Upper portions of the first and second active patterns AP1 and AP2 may protrude vertically above the device isolation layer ST (e.g., see FIG. 15D). Each of the upper portions of the first and second active patterns AP1 and AP2 may be a fin-shaped pattern. The device isolation layer ST may not cover the upper portions of the first and second active patterns AP1 and AP2. The device isolation layer ST may cover lower side surfaces of the first and second active patterns AP1 and AP2.

Figure 15A:
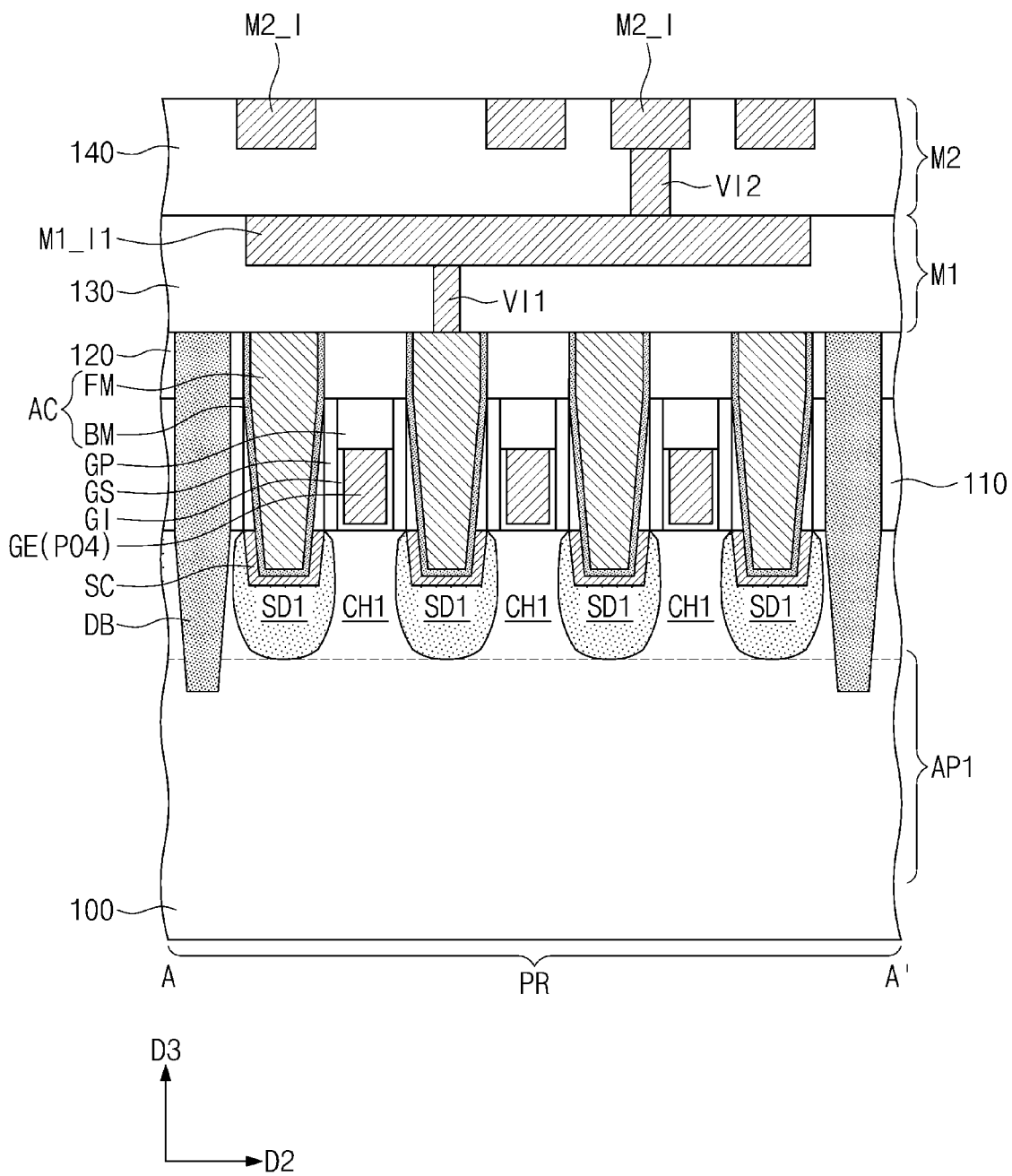
FIGS. 15A to 15D are sectional views, which are respectively taken along lines A-A', B-B', C-C', and D-D' of FIG. 14.
Figure 15B:
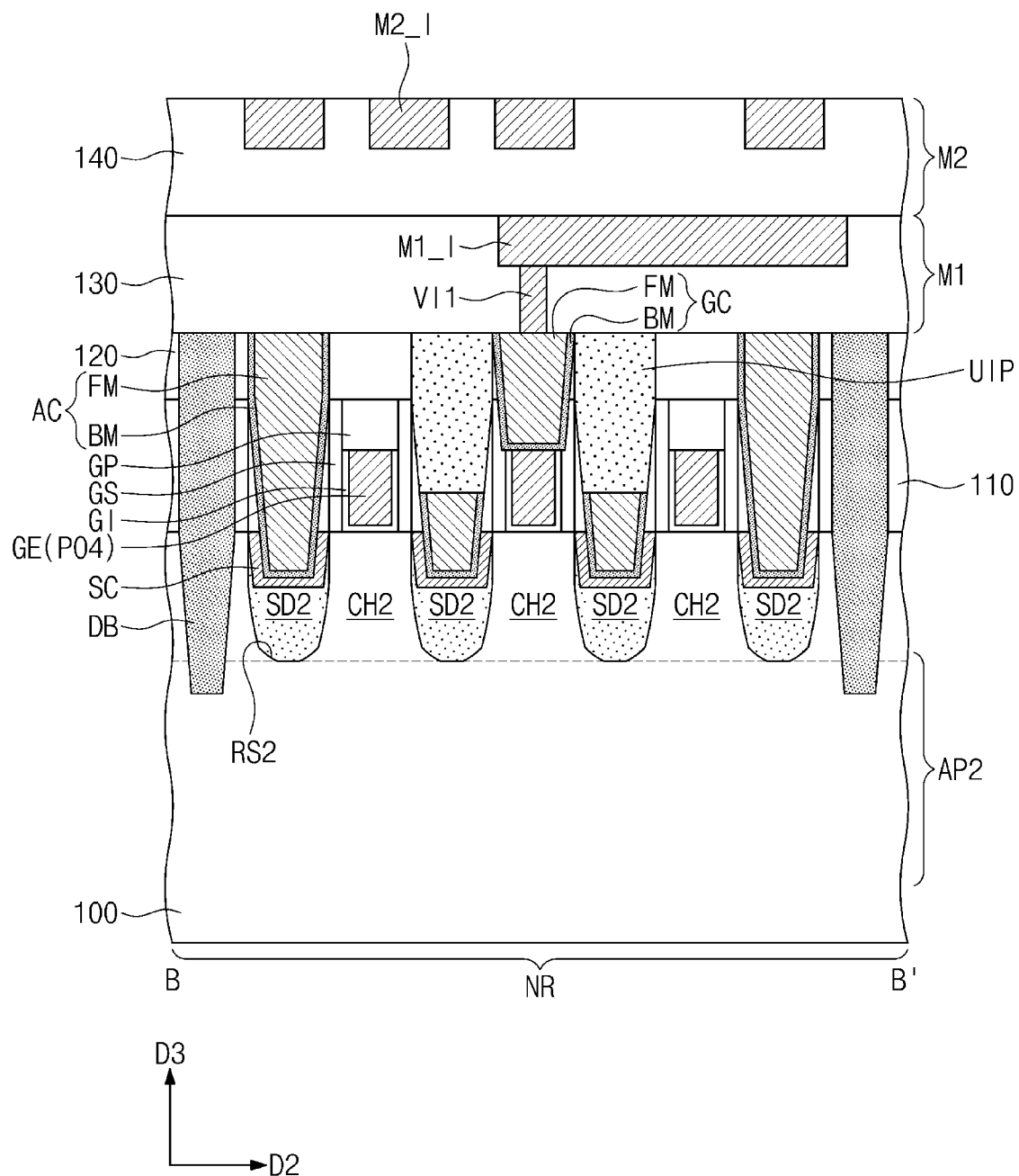
Figure 15C:
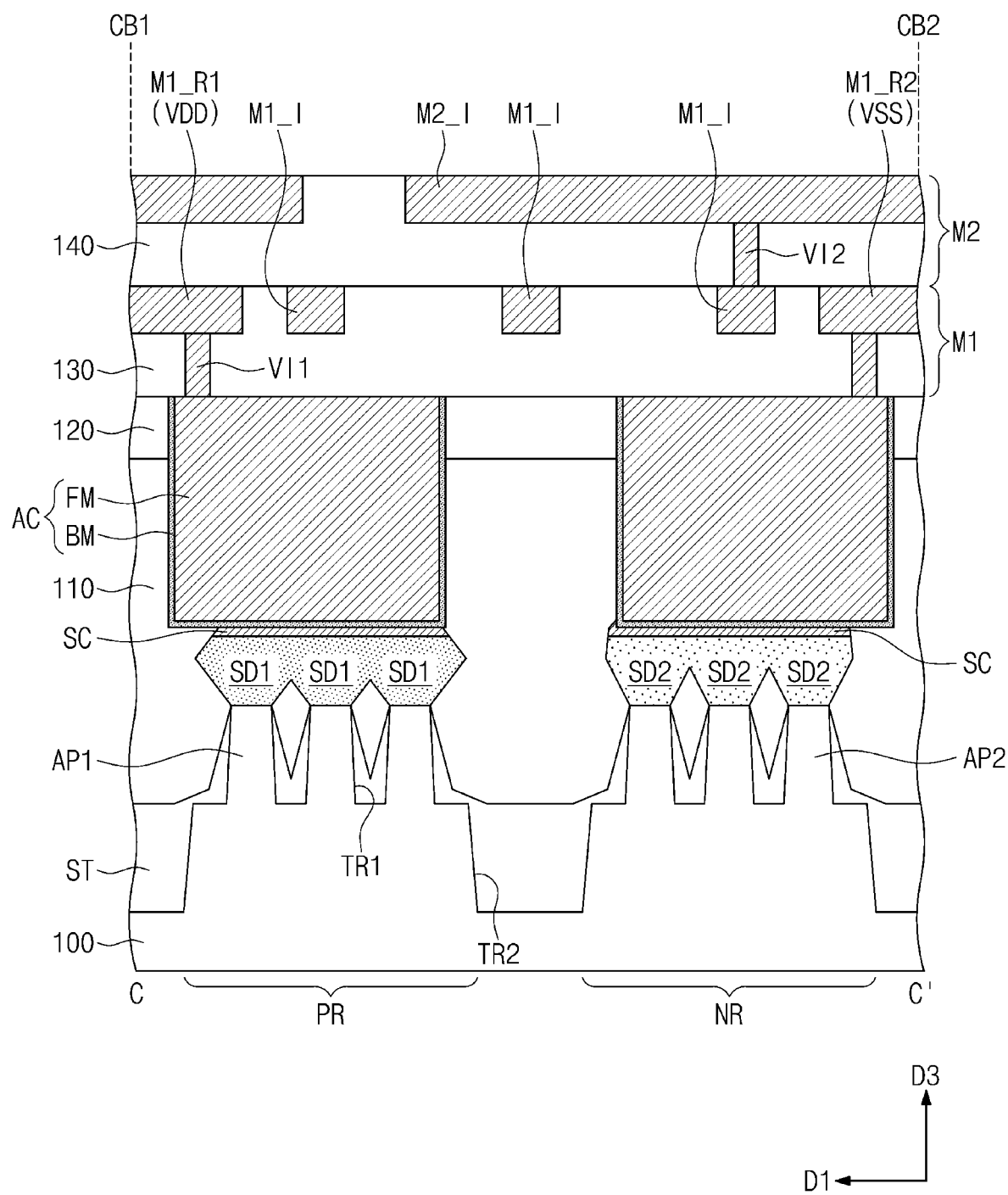

First source/drain patterns SD1 may be provided in the upper portions of the first active patterns AP1 (see, e.g., FIG. 15C). The first source/drain patterns SD1 may be impurity regions of a first conductivity type (e.g., p-type). A first channel pattern CH1 may be interposed between each pair of the first source/drain patterns SD1 (see, e.g., FIG. 15A). Second source/drain patterns SD2 may be provided in the upper portions of the second active patterns AP2 (see, e.g., FIG. 15B). The second source/drain patterns SD2 may be impurity regions of a second conductivity type (e.g., n-type). A second channel pattern CH2 may be interposed between each pair of the second source/drain patterns SD2.

The first and second source/drain patterns SD1 and SD2 may be epitaxial patterns, which are formed by a selective epitaxial growth process. In an embodiment, the first and second source/drain patterns SD1 and SD2 may have top surfaces that are coplanar with top surfaces of the first and second channel patterns CH1 and CH2. Alternatively, in some example embodiments, the top surfaces of the first and second source/drain patterns SD1 and SD2 may be higher than the top surfaces of the first and second channel patterns CH1 and CH2.

The first source/drain patterns SD1 may be formed of or include a semiconductor material (e.g., SiGe) having a lattice constant greater than that of the substrate 100. In this case, the first source/drain patterns SD1 may exert a compressive stress on the first channel patterns CH1. The second source/drain patterns SD2 may be formed of or include the same semiconductor material (e.g., Si) as the substrate 100.

Gate electrodes GE may be provided to cross the first and second active patterns AP1 and AP2 and to extend in the first direction D1 (see, e.g., FIGS. 15A and 15B). The gate electrodes GE may be arranged at a constant pitch in the second direction D2. The gate electrodes GE may be vertically overlapped with the first and second channel patterns CH1 and CH2. Each of the gate electrodes GE may be provided to face a top surface and opposite side surfaces of each of the first and second channel patterns CH1 and CH2.

Figure 15D:
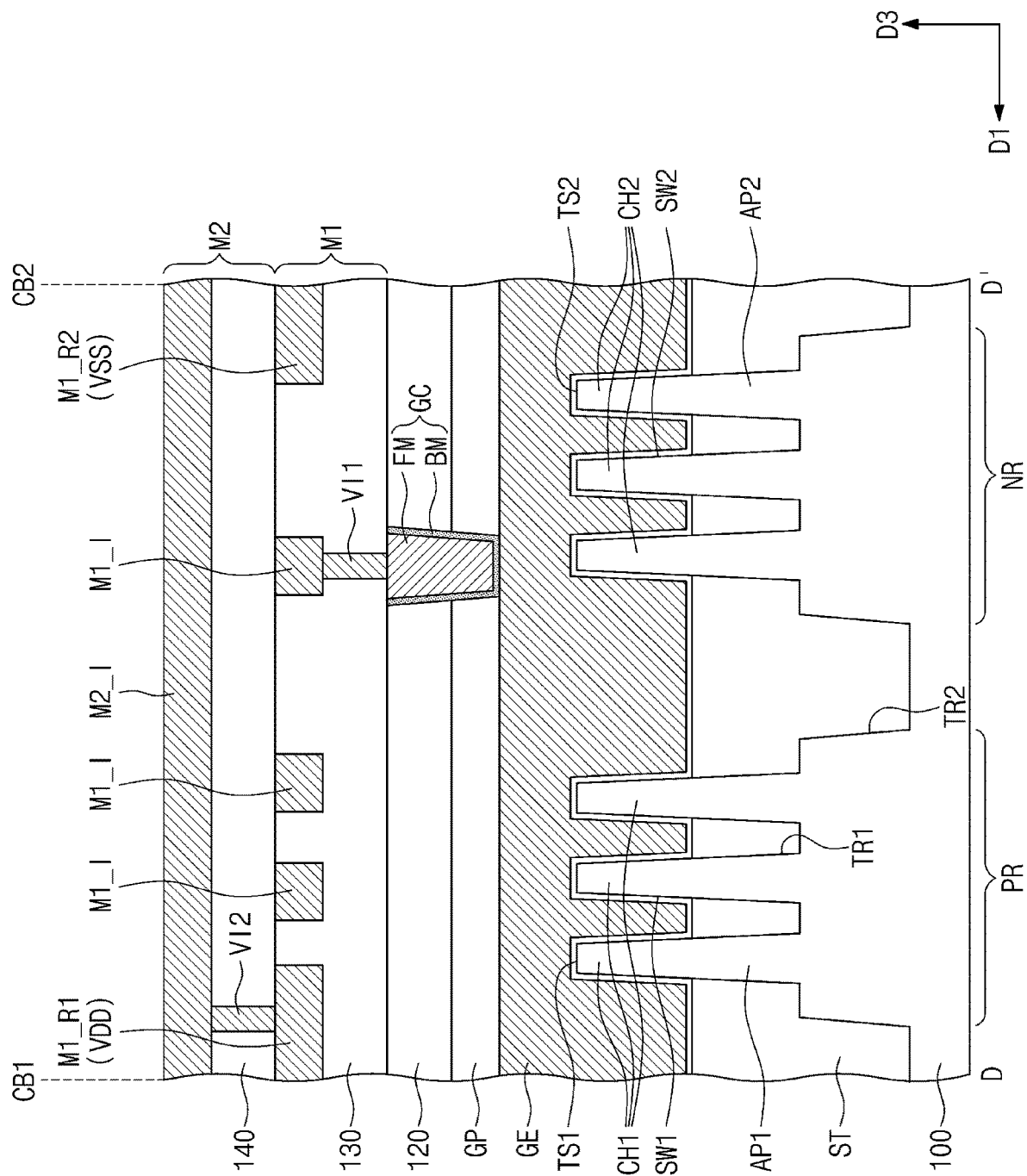

Referring to FIG. 15D, the gate electrode GE may be provided on a first top surface TS1 of the first channel pattern CH1 and on at least one first side surface SW1 of the first channel pattern CH1. The gate electrode GE may be provided on a second top surface TS2 of the second channel pattern CH2 and on at least one second side surface SW2 of the second channel pattern CH2. In other words, the transistor according to FIGS. 14-15D may be a three-dimensional field-effect transistor (e.g., FinFET), in which the gate electrode GE is provided to three-dimensionally surround the first or second channel pattern CH1 or CH2.

Referring to FIGS. 14 and 15A to 15D, a pair of gate spacers GS may be disposed on opposite side surfaces of each of the gate electrodes GE. The gate spacers GS may be extended along the gate electrodes GE and in the first direction D1. Top surfaces of the gate spacers GS may be higher than top surfaces of the gate electrodes GE. The top surfaces of the gate spacers GS may be coplanar with a top surface of a first interlayer insulating layer 110, which will be described below. The gate spacers GS may be formed of or include at least one of SiCN, SiCON, or SiN. As another example, the gate spacers GS may include a multi-layer containing at least two of SiCN, SiCON, or SiN.

A gate capping pattern GP may be provided on each of the gate electrodes GE. The gate capping pattern GP may be extended along the gate electrode GE and in the first direction D1. The gate capping pattern GP may be formed of or include a material having an etch selectivity with respect to the interlayer insulating layer 110 and a second interlayer insulating layer 120, which will be described below. For example, the gate capping patterns GP may be formed of or include at least one of SiON, SiCN, SiCON, or SiN.

Gate dielectric patterns GI may be respectively interposed between the gate electrode GE and the first active pattern AP1 and between and the gate electrode GE and the second active pattern AP2. The gate dielectric pattern GI may be extended along a bottom surface of the gate electrode GE disposed thereon. As an example, the gate dielectric pattern GI may cover the first top surface TS1 and the first side surface SW1 of the first channel pattern CH1. The gate dielectric pattern GI may cover the second top surface TS2 and the second side surfaces SW2 of the second channel pattern CH2. In an embodiment, the gate dielectric pattern GI may be provided to cover a top surface of the device isolation layer ST below the gate electrode GE (e.g., see FIG. 15D).

In an embodiment, the gate dielectric pattern GI may be formed of or include a high-k dielectric material whose dielectric constant is higher than that of a silicon oxide layer. For example, the high-k dielectric material may include at least one of hafnium oxide, hafnium silicon oxide, hafnium zirconium oxide, hafnium tantalum oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, or lead zinc niobate.

The gate electrode GE may include a first metal pattern and a second metal pattern on the first metal pattern. The first metal pattern may be provided on the gate dielectric pattern GI and near the first and second channel patterns CH1 and CH2. The first metal pattern may include a work-function metal, which can be used to adjust a threshold voltage of the transistor. By adjusting a thickness and composition of the first metal pattern, it may be possible to realize a transistor having a desired threshold voltage.

The first metal pattern may include a metal nitride layer. For example, the first metal pattern may include a layer that is compose of at least one metallic material, which is selected from the group consisting of titanium (Ti), tantalum (Ta), aluminum (Al), tungsten (W) and molybdenum (Mo), and nitrogen (N). In an embodiment, the first metal pattern may further include carbon (C). The first metal pattern may include a plurality of stacked work-function metal layers.

The second metal pattern may be formed of or include a metallic material whose resistance is lower than the first metal pattern. For example, the second metal pattern may include at least one metallic material, which is selected from the group consisting of tungsten (W), aluminum (Al), titanium (Ti), and tantalum (Ta).

The first interlayer insulating layer 110 may be provided on the substrate 100. The first interlayer insulating layer 110 may cover the gate spacers GS and the first and second source/drain patterns SD1 and SD2. A top surface of the first interlayered insulating layer 110 may be substantially coplanar with the top surfaces of the gate capping patterns GP and the top surfaces of the gate spacers GS. The second interlayer insulating layer 120 may be provided on the first interlayer insulating layer 110 to cover the gate capping patterns GP. A third interlayer insulating layer 130 may be provided on the second interlayer insulating layer 120. A fourth interlayer insulating layer 140 may be provided on the third interlayer insulating layer 130. In an embodiment, at least one of the first to fourth interlayer insulating layers 110 to 140 may include a silicon oxide layer.

A pair of division structures DB, which are opposite to each other in the second direction D2, may be provided at both sides of the logic cell. The division structure DB may be extended in the first direction D1 to be parallel to the gate electrodes GE. A pitch between the division structure DB and the gate electrode GE adjacent thereto may be equal to a pitch between the gate electrodes GE.

The division structure DB may be provided to penetrate the first and second interlayer insulating layers 110 and 120 and may be extended into the first and second active patterns AP1 and AP2. The division structure DB may be provided to penetrate an upper portion of each of the first and second active patterns AP1 and AP2. The division structure DB may separate the first and second active regions PR and NR of the logic cell from the active region of a neighboring logic cell.

Active contacts AC may be provided to penetrate the first and second interlayer insulating layers 110 and 120 and may be electrically connected to the first and second source/drain patterns SD1 and SD2, respectively. Each of the active contacts AC may be provided between a pair of the gate electrodes GE.

The active contact AC may be a self-aligned contact. For example, the active contact AC may be formed by a self-alignment process using the gate capping pattern GP and the gate spacer GS. In an embodiment, the active contact AC may cover at least a portion of the side surface of the gate spacer GS. Although not shown, the active contact AC may cover a portion of the top surface of the gate capping pattern GP.

Silicide patterns SC may be interposed between the active contact AC and the first source/drain pattern SD1 and between the active contact AC and the second source/drain pattern SD2. The active contact AC may be electrically connected to the source/drain pattern SD1 or SD2 through the silicide pattern SC. The silicide pattern SC may be formed of or include at least one of metal silicide materials (e.g., titanium silicide, tantalum silicide, tungsten silicide, nickel silicide, and cobalt silicide).

A gate contact GC may be provided to penetrate the second interlayer insulating layer 120 and the gate capping pattern GP and may be electrically connected to the gate electrode GE. Referring to FIG. 15B, an upper region of each of the active contacts AC adjacent to the gate contact GC may be filled with an upper insulating pattern UIP. In this case, it may be possible to prevent the gate contact GC from being in contact with the active contact AC adjacent thereto and thereby to prevent a short circuit issue from occurring between the gate and active contacts GC and AC.

Each of the active and gate contacts AC and GC may include a conductive pattern FM and a barrier pattern BM enclosing the conductive pattern FM. For example, the conductive pattern FM may be formed of or include at least one of metallic materials (e.g., aluminum, copper, tungsten, molybdenum, and cobalt). The barrier pattern BM may be provided to cover side and bottom surfaces of the conductive pattern FM. In an embodiment, the barrier pattern BM may include a metal layer and a metal nitride layer. The metal layer may be formed of or include at least one of titanium, tantalum, tungsten, nickel, cobalt, or platinum. The metal nitride layer may be formed of or include at least one of titanium nitride (TiN), tantalum nitride (TaN), tungsten nitride (WN), nickel nitride (NiN), cobalt nitride (CoN), or platinum nitride (PtN).

The first metal layer M1 may be provided in the third interlayer insulating layer 130. The first metal layer M1 may include a first power line M1_R1, a second power line M1_R2, and lower interconnection lines M1_I (see, e.g., FIG. 15C).

Each of the first and second power lines M1_R1 and M1_R2 may be extended in the second direction D2 to cross the logic cell. In detail, a first cell border CB1 extending in the second direction D2 may be defined in the logic cell (see, e.g., FIG. 14). A second cell border CB2 may be defined in a region of the logic cell LC opposite to the first cell border CB1. The first power line M1_R1 may be disposed on the first cell border CB1. The first power line M1_R1 may be extended along the first cell border CB1 and in the second direction D2. The second power line M1_R2 may be disposed on the second cell border CB2. The second power line M1_R2 may be extended along the second cell border CB2 and in the second direction D2.

The lower interconnection lines M1_I may be disposed between the first and second power lines M1_R1 and M1_R2. The lower interconnection lines M1_I may be line- or bar-shaped patterns extending in the second direction D2.

The lower interconnection lines M1_I may be arranged at a constant pitch in the first direction D1.

The first metal layer M1 may further include first vias VI1. The first vias VI1 may be provided below the lower interconnection lines M1_I. One of the first vias VI1 may be interposed between the active contact AC and the lower interconnection line M1_I to electrically connect them to each other. Another of the first vias VI1 may be interposed between the gate contact GC and the lower interconnection line M1_I to electrically connect them to each other.

In an embodiment, the lower interconnection line M1_I and the first via VI1 thereunder may be respectively formed by different processes. That is, each of the lower interconnection line and the lower via of the first metal layer M1 may be formed by a single damascene process. The semiconductor device may be fabricated using a sub-20 nm process.

The second metal layer M2 may be provided in the fourth interlayer insulating layer 140. The second metal layer M2 may include upper interconnection lines M2_I. The upper interconnection lines M2_I may be patterns which are formed using the modified layout patterns LPT of FIG. 13.

For example, referring to FIG. 14, the upper interconnection lines M2_I may include a first interconnection line M2_I1, a second interconnection line M2_I2, and a third interconnection line M2_I3. The second interconnection line M2_I2 may be located between the first interconnection line M2_I1 and the third interconnection line M2_I3.

According to the original layout LO of FIG. 12, the second interconnection line M2_I2 may have the SLO defect of FIG. 7 with a high probability. According to an embodiment, the defect probability of the second interconnection line M2_I2 may be predicted in advance, and ends of the first and third interconnection line M2_I1 and M2_I3 near the second interconnection line M2_I2 may be modified to prevent a defect of the second interconnection line M2_I2. Accordingly, the second interconnection line M2_I2 may be formed to have a line shape which is extended in the first direction D1 stably (i.e., without a cut portion).

The second metal layer M2 may further include second vias VI2. The second vias VI2 may be provided below the upper interconnection lines M2_I, respectively. The lower interconnection line M1_I and the upper interconnection line M2_I may be electrically connected to each other through the second via VI2.

The upper interconnection line M2_I and the second via VI2 thereunder may be formed by the same process, and in this case, the upper interconnection line M2_I and the second via VI2 may constitute a single object. In other words, the upper interconnection line M2_I and the second via VI2 of the second metal layer M2 may be formed by a dual damascene process.

The interconnection lines of the first metal layer M1 may be formed of or include a conductive material that is the same as or different from that of the second metal layer M2. For example, the interconnection lines of the first and second metal layers M1 and M2 may be formed of or include at least one of metallic materials (e.g., aluminum, copper, tungsten, molybdenum, and cobalt). Although not shown, a plurality of metal layers may be further stacked on the fourth interlayered insulating layer 140. Each of the stacked metal layers may include routing lines.

It is noted that, while the SLO defect and the defect probability prediction is described with reference to the second metal layer M2 and the second interconnection line M2_I2, embodiments are not limited thereto and, in some embodiments, the defect prediction process described with respect to FIG. 4 may also be used on the first metal layer M1 or other metal layers.

FIGS. 16A to 16D are sectional views, which are respectively taken along lines A-A', B-B', C-C', and D-D' of FIG. 14 to illustrate a semiconductor device according to an embodiment. In the following description, an element previously described with reference to FIGS. 14 and 15A to 15D may be identified by the same reference number without repeating an overlapping description thereof, for the sake of brevity.

Referring to FIGS. 14 and 16A to 16D, the substrate 100 including the first and second active regions PR and NR may be provided. The device isolation layer ST may be provided on the substrate 100. The device isolation layer ST may define the first and second active patterns AP1 and AP2 in an upper portion of the substrate 100. The first and second active patterns AP1 and AP2 may be defined on the first and second active regions PR and NR, respectively.

The first active pattern AP1 may include the first channel patterns CH1, which are vertically stacked. The stacked first channel patterns CH1 may be spaced apart from each other in the third direction D3. The stacked first channel patterns CH1 may be vertically overlapped with each other. The second active pattern AP2 may include the second channel patterns CH2, which are vertically stacked. The stacked second channel patterns CH2 may be spaced apart from each other in the third direction D3. The stacked second channel patterns CH2 may be vertically overlapped with each other. The first and second channel patterns CH1 and CH2 may be formed of or include at least one of silicon (Si), germanium (Ge), or silicon germanium (SiGe).

The first active pattern AP1 may further include the first source/drain patterns SD1. The stacked first channel patterns CH1 may be interposed between each adjacent pair of the first source/drain patterns SD1. The stacked first channel patterns CH1 may connect the adjacent pair of the first source/drain patterns SD1 to each other.

The second active pattern AP2 may further include the second source/drain patterns SD2. The stacked second channel patterns CH2 may be interposed between each adjacent pair of the second source/drain patterns SD2. The stacked second channel patterns CH2 may connect the adjacent pair of the second source/drain patterns SD2 to each other.

The gate electrodes GE may be provided to cross the first and second channel patterns CH1 and CH2 and to extend in the first direction D1. The gate electrode GE may be vertically overlapped with the first and second channel patterns CH1 and CH2. A pair of the gate spacers GS may be disposed on opposite side surfaces of the gate electrode GE. The gate capping pattern GP may be provided on the gate electrode GE.

Figure 16A:
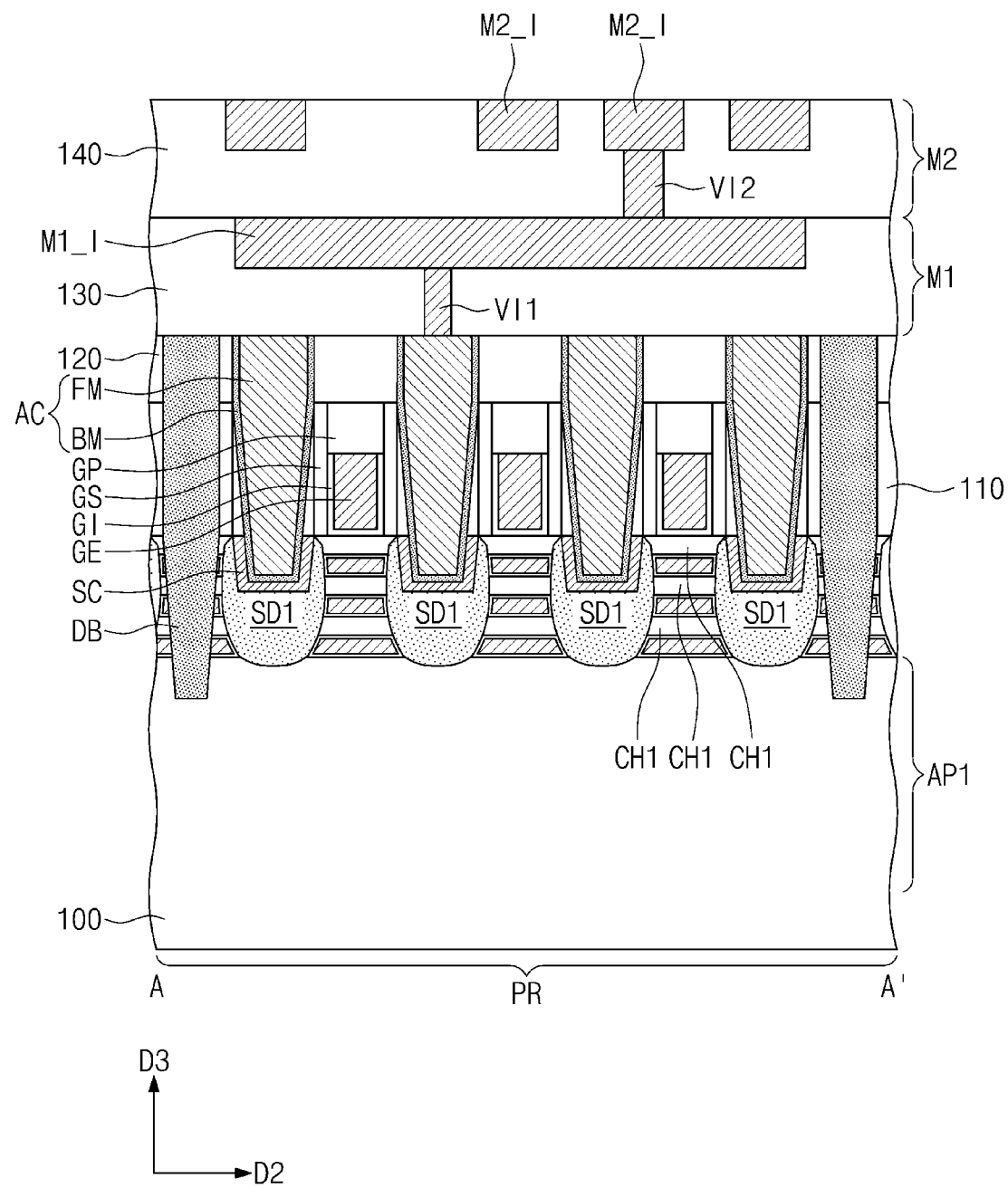
FIGS. 16A to 16D are sectional views which are respectively taken along the lines A-A', B-B', C-C', and D-D' of FIG. 14 to illustrate a semiconductor device according to an embodiment.
Figure 16B:
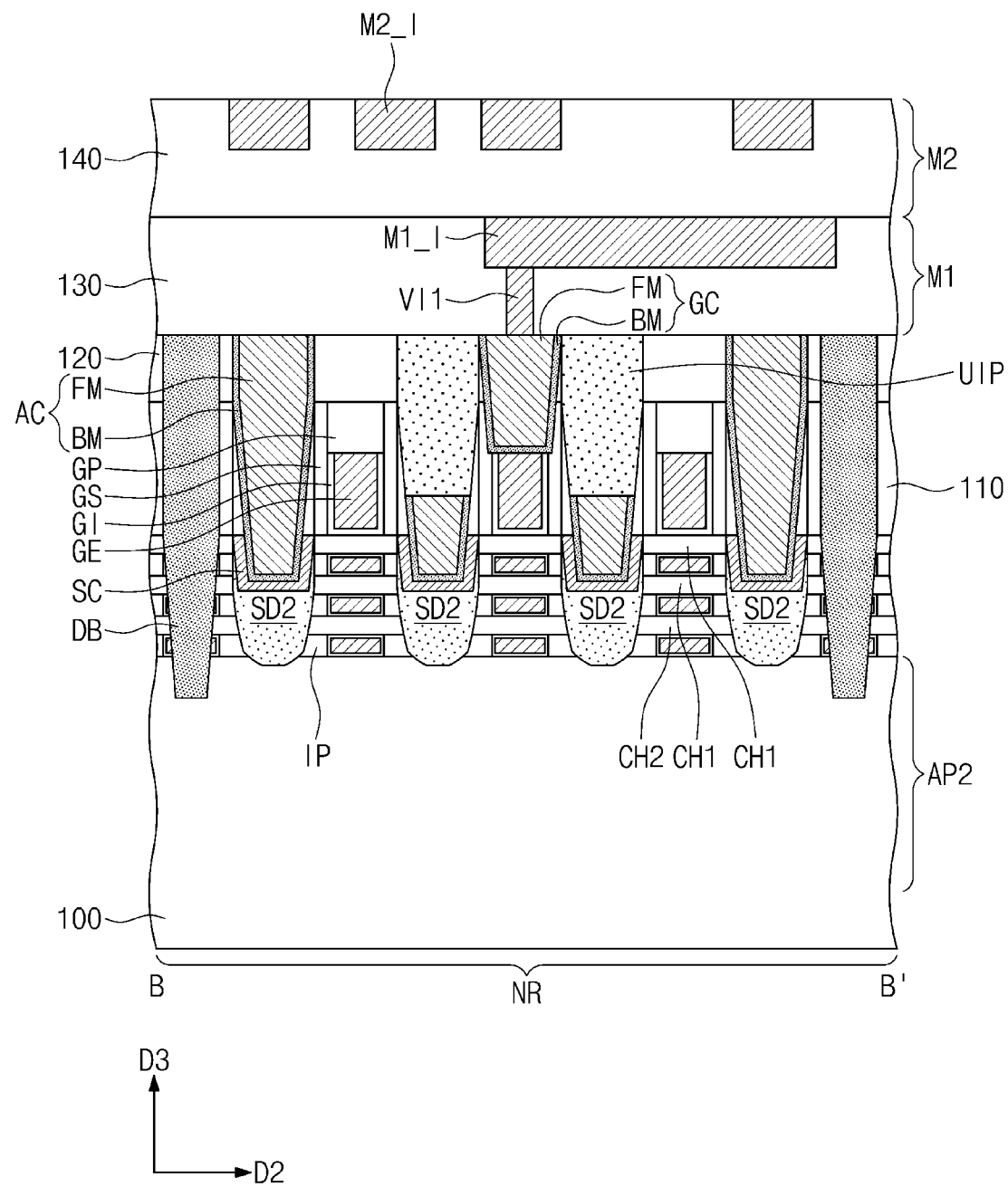
Figure 16C:
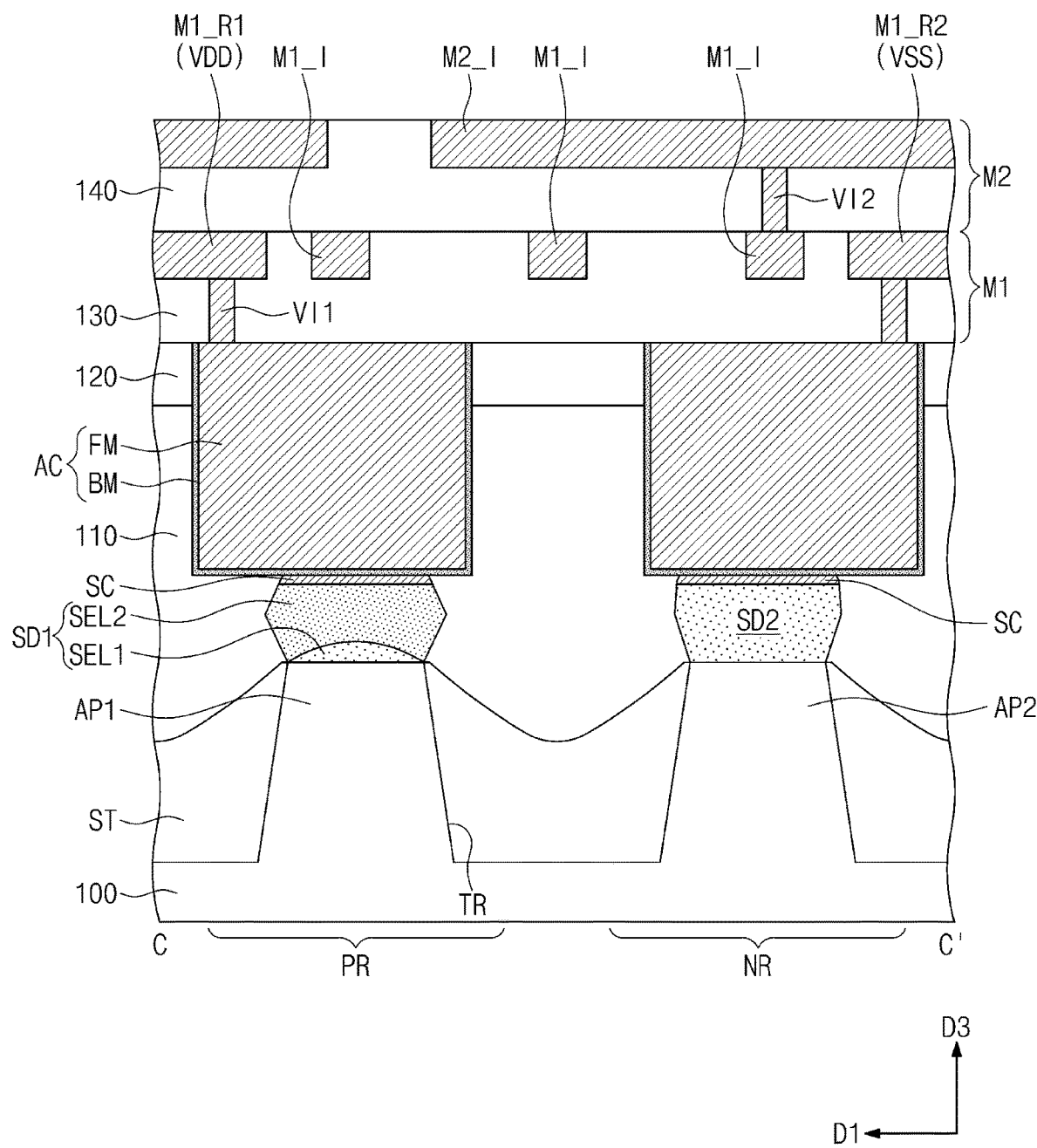
Figure 16D:
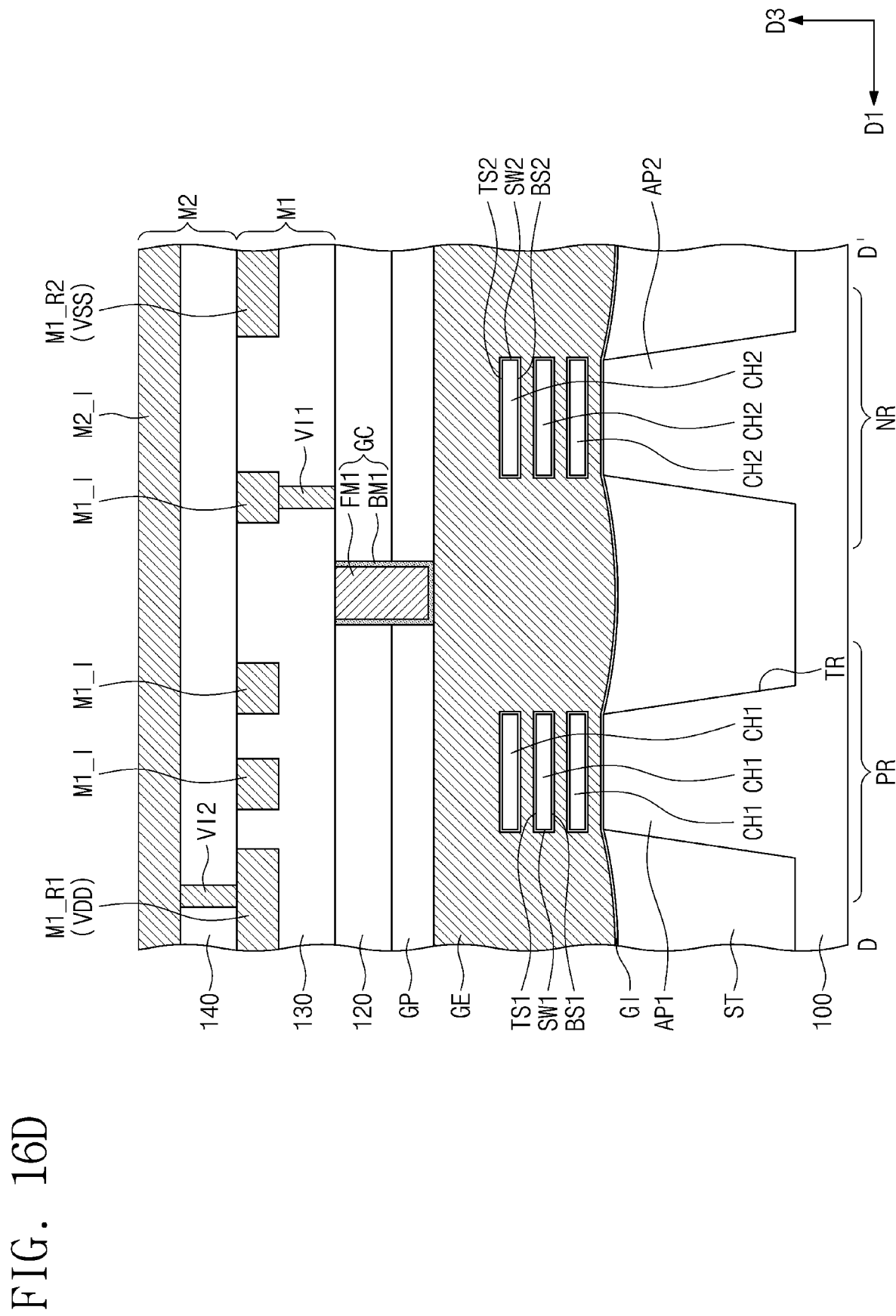

The gate electrode GE may be provided to surround each of the first and second channel patterns CH1 and CH2 (e.g., see FIG. 16D). The gate electrode GE may be provided on a first top surface TS1, at least one first side surface SW1, and a first bottom surface BS1 of the first channel pattern CH1. The gate electrode GE may be provided on a second top surface TS2, at least one second side surface SW2, and a second bottom surface BS2 of the second channel pattern CH2. That is, the gate electrode GE may be provided to face a top surface, a bottom surface and both side surfaces of each of the first and second channel patterns CH1 and CH2. The transistor according to FIGS. 16A-16D may be a three-dimensional field effect transistor (e.g., a multi-bridge channel field-effect transistor (MBCFET)), in which the gate electrode GE is disposed to three-dimensionally surround the channel patterns CH1 and CH2.

The gate dielectric pattern GI may be provided between the gate electrode GE and each of the first and second channel patterns CH1 and CH2. The gate dielectric pattern GI may be provided to surround each of the first and second channel patterns CH1 and CH2.

An insulating pattern IP may be interposed between the gate dielectric pattern GI and the second source/drain pattern SD2, on the second active region NR. The gate electrode GE may be spaced apart from the second source/drain pattern SD2 by the gate dielectric pattern GI and the insulating pattern IP. In an embodiment, the insulating pattern IP on the first active region PR may be omitted.

The first interlayer insulating layer 110 and the second interlayer insulating layer 120 may be provided on the substrate 100. The active contacts AC may be provided to penetrate the first and second interlayer insulating layers 110 and 120 and may be connected to the first and second source/drain patterns SD1 and SD2, respectively. The gate contact GC may be provided to penetrate the second interlayer insulating layer 120 and the gate capping pattern GP and may be electrically connected to the gate electrode GE.

The third interlayer insulating layer 130 may be provided on the second interlayer insulating layer 120. The fourth interlayer insulating layer 140 may be provided on the third interlayer insulating layer 130. The first metal layer M1 may be provided in the third interlayer insulating layer 130. The second metal layer M2 may be provided in the fourth interlayer insulating layer 140. The first and second metal layers M1 and M2 may be substantially the same as those described with reference to FIGS. 14 and 15A to 15D, and thus a repeated description thereof is omitted for conciseness.

Figure 17:
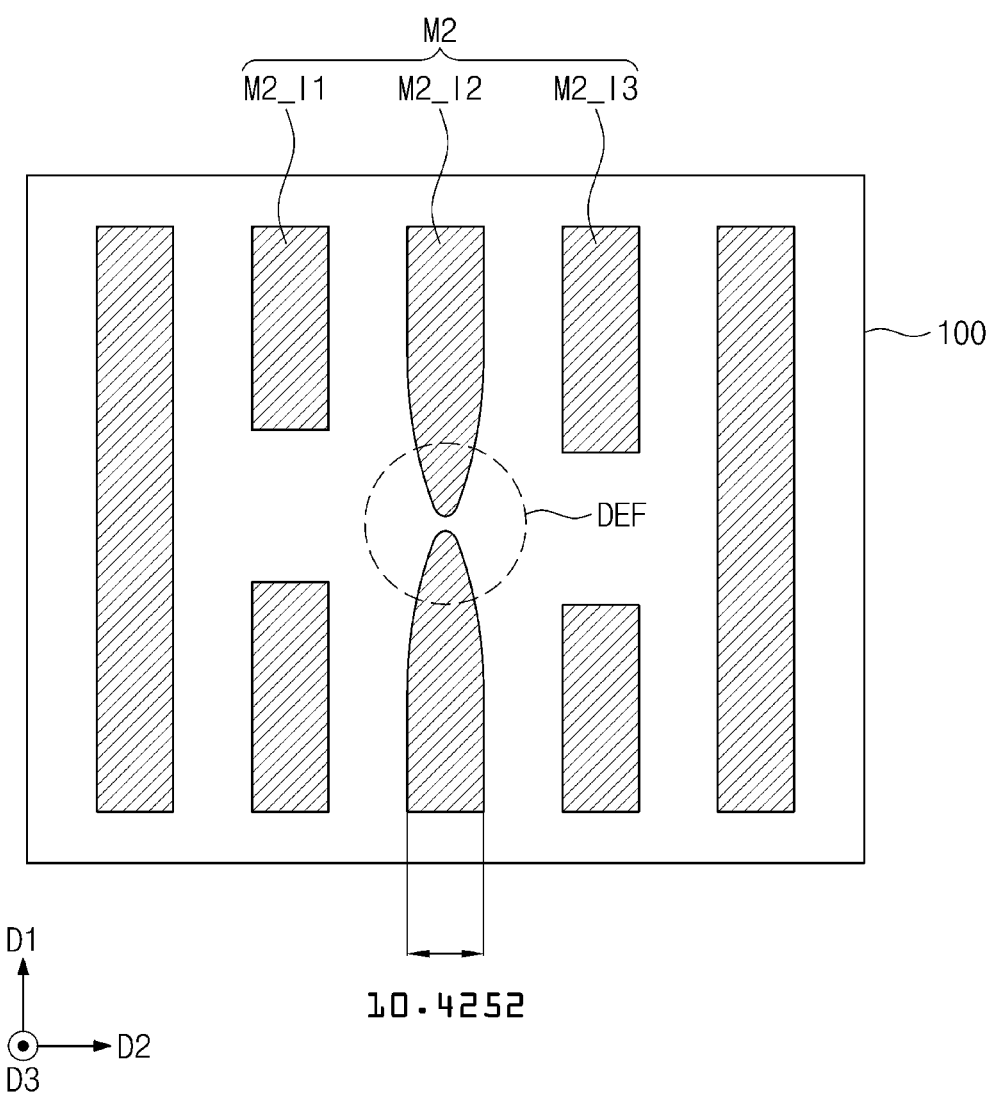
FIG. 17 is a plan view illustrating a semiconductor device according to an embodiment.

FIG. 17 is a plan view illustrating a semiconductor device according to an embodiment. FIG. 17 illustrates an example of a semiconductor device, in which the second layout LO of FIG. 12 is realized as the second metal layer M2 on a substrate.

Referring to FIG. 17, the second metal layer M2 may be formed on the substrate 100. In detail, the second metal layer M2 may include the first interconnection line M2_I1, the second interconnection line M2_I2, and the third interconnection line M2_I3. The second interconnection line M2_I2 may be positioned between the first interconnection line M2_I1 and the third interconnection line M2_I3. Unlike the second layout LO of FIG. 12, the second interconnection line M2_I2 of FIG. 17 may be cut into two portions which are disconnected from each other in the first direction D1. That is, the second interconnection line M2_I2, which is realized on an actual wafer through the EUV lithography process, may have a defect DEF.

It may be necessary to determine whether the defect DEF of the second interconnection line M2_I2 is a random defect, which is caused by a limitation of the EUV lithography process previously described with reference to FIG. 7, or a controllable process defect (e.g., as systematic defect). If the defect DEF is the controllable process defect, such a portion (e.g., a defect issue of the manufactured photomask, a defect issue of the EUV system, and so forth) may be searched and solved.

In the step of determining whether the defect DEF of the second interconnection line M2_I2 is the random defect or the controllable defect, a defect frequency and a defect rate of a unique pattern region previously described with reference to FIGS. 4 to 11 may be determined and considered.

In light of the previously calculated and collected data of the defect frequency and the defect rate, if the defect DEF of the second interconnection line M2_I2 coincides with the data, the defect DEF may be determined as the random defect.

In light of the previously calculated and collected data of the defect frequency and the defect rate, if the defect DEF of the second interconnection line M2_I2 does not coincide with the data, the defect DEF may be determined as the controllable defect.

According to an embodiment, in a method of predicting defects in an EUV lithography process, a stochastic variation band (SVB) of a unique pattern in a weak region may be calculated based on a dose mask sensitivity (DMS) model. By using a Gaussian distribution of the SVB, it may be possible to effectively predict a degree of occurrence of defects in the EUV lithography process. Based on the predicted degree of the defects, a design of an actual layout may be modified to minimize occurrence of the defect. It may be possible to effectively determine whether a defect, which occurs on a wafer during the EUV lithography process, is a random defect or a systematic defect, based on the predicted degree of the defects. As a result, it may be possible to improve the reliability of the semiconductor device and to increase a production yield in the fabrication process.

While example embodiments have been particularly shown and described, it will be understood by one of ordinary skill in the art that variations in form and detail may be made therein without departing from the spirit and scope of the attached claims.

What is claimed is:

1. A method comprising:
in a first layout, grouping pattern regions, which have duplicate layout patterns, as a group, each of the pattern regions comprising a weak region in which a random defect may occur when an extreme ultraviolet (EUV) lithography process is performed;
for each of the pattern regions, performing an optical proximity correction (OPC) simulation on the pattern region, calculating a stochastic variation of a linewidth of a simulation pattern in the weak region as a Gaussian distribution, and defining a threshold linewidth, which is used as a reference of the random defect, in the Gaussian distribution;
calculating defect probabilities of the pattern regions, respectively, based on the threshold linewidths of the respective pattern regions;
calculating a defect frequency and a defect rate of the group based on the defect probabilities of the pattern regions;
predicting a degree of defects of a second layout of the pattern regions, based on the defect frequency and the defect rate; and
performing an EUV lithography process on a substrate, based on the second layout.

2. The method of claim 1, wherein the calculating of the stochastic variation of the linewidth comprises:
calculating Gaussian distributions of contours of the simulation pattern in the weak region; and
summing the Gaussian distributions of the contours.

3. The method of claim 2, wherein the contours comprise a first edge and a second edge,
the calculating of the Gaussian distributions of the contours comprises:
calculating a first stochastic variation of the first edge as a first Gaussian distribution; and calculating a second stochastic variation of the second edge as a second Gaussian distribution, and the summing the Gaussian distributions of the contours comprises summing the first Gaussian distribution and the second Gaussian distribution.

4. The method of claim 3, wherein a first standard deviation of the first Gaussian distribution is different from a second standard deviation of the second Gaussian distribution.

5. The method of claim 1, wherein the defect frequency is a sum of the defect probabilities of the pattern regions of the group, and the defect rate is a value that is obtained by dividing the defect frequency by a number of the pattern regions in the group.

6. The method of claim 1, wherein the defect probabilities of the pattern regions of the group have values that are different from each other.

7. The method of claim 1, wherein the pattern regions comprises a first pattern region at a first position on the first layout and a second pattern region at a second position on the first layout, the first pattern region and the second pattern region have a same shape, and a first standard deviation of the Gaussian distribution calculated from the first pattern region is different from a second standard deviation of the Gaussian distribution calculated from the second pattern region.

8. The method of claim 1, wherein the first layout is a virtual layout that is generated based on a virtual netlist, and the second layout is a layout of a semiconductor device.

9. The method of claim 1, further comprising modifying a layout pattern of the second layout, based on a predicted defect of the second layout.

10. The method of claim 1, further comprising determining whether a defect of a pattern, which is formed on the substrate by the EUV lithography process, corresponds to the random defect, based on a predicted defect of the second layout.

11. A method comprising:

searching for a pattern region in a first layout that includes a weak region in which a random defect may occur when an extreme ultraviolet (EUV) lithography process is performed;

performing an optical proximity correction (OPC) simulation on the pattern region;

calculating a stochastic variation of a linewidth of a simulation pattern in the weak region as a Gaussian distribution;

defining a threshold linewidth as a reference of the random defect;

applying the threshold linewidth to the Gaussian distribution to calculate a defect probability of the pattern region, based on the threshold linewidth;

searching for the pattern region in a second layout to predict a degree of defects of the second layout; and performing an EUV lithography process on a substrate, based on the second layout.

12. The method of claim 11, wherein the simulation pattern in the weak region comprises a first edge and a second edge, and the calculating of the stochastic variation of the linewidth comprises:

calculating a first stochastic variation of the first edge as a first Gaussian distribution;

calculating a second stochastic variation of the second edge as a second Gaussian distribution; and summing the first Gaussian distribution and the second Gaussian distribution as the Gaussian distribution.

13. The method of claim 12, wherein the linewidth is a distance between the first edge and the second edge.

14. The method of claim 12, wherein a first standard deviation of the first Gaussian distribution is different from a second standard deviation of the second Gaussian distribution.

15. The method of claim 12, wherein the calculating of the first stochastic variation of the first edge comprises using a stochastic variation band (SVB) of the first edge, the SVB decreases as an intensity value of an EUV light increases, and the SVB decreases as an EUV sensitivity value increases.

16. A method comprising:

in a first layout, grouping first pattern regions which have duplicate first layout patterns as a first group and grouping second pattern regions which have duplicate second layout patterns as a second group, the duplicate second layout patterns being different from the duplicate first layout patterns;

calculating first defect probabilities of the first pattern regions, respectively;

calculating second defect probabilities of the second pattern regions, respectively;

calculating a first defect frequency and a first defect rate of the first group using the first defect probabilities;

calculating a second defect frequency and a second defect rate of the second group using the second defect probabilities; and predicting defects in an extreme ultraviolet (EUV) lithography process based on the first defect frequency, the first defect rate, the second defect frequency, and the second defect rate.

17. The method of claim 16, wherein each of the first pattern regions comprises a weak region in which a random defect may occur when an extreme ultraviolet (EUV) lithography process is performed, and the calculating of the first defect probabilities comprises, for each first pattern region:

performing an OPC simulation on the first pattern region;

calculating a stochastic variation of a linewidth of a simulation pattern in the weak region as a Gaussian distribution; and defining a threshold linewidth as a reference of the random defect, in the Gaussian distribution, wherein the first defect probabilities are calculated based on the threshold linewidth.

18. The method of claim 16, wherein the first defect frequency is a sum of the first defect probabilities of the first pattern regions of the first group, and the first defect rate is a value that is obtained by dividing the first defect frequency by a number of the first pattern regions in the first group.

19. The method of claim 16, wherein the second defect frequency is a sum of the second defect probabilities of the second pattern regions of the second group, and the second defect rate is a value that is obtained by dividing the second defect frequency by a number of the second pattern regions in the second group.

20. The method of claim 16, wherein the first defect frequency is higher than the second defect frequency, and the first defect rate is lower than the second defect rate.

* * * * *